United States Patent
Klein et al.

(10) Patent No.: US 11,838,824 B2
(45) Date of Patent: *Dec. 5, 2023

(54) REMOTE AND SHARED ACCESS FOR NETWORK CONNECTED DEVICES

(71) Applicant: RACHIO, INC., Denver, CO (US)

(72) Inventors: Christopher Michael Klein, Denver, CO (US); Franz David Garsombke, Golden, CO (US)

(73) Assignee: RACHIO, INC., Denver, CO (US)

( * ) Notice: Subject to any disclaimer, the term of this patent is extended or adjusted under 35 U.S.C. 154(b) by 393 days.

This patent is subject to a terminal disclaimer.

(21) Appl. No.: 17/183,534

(22) Filed: Feb. 24, 2021

(65) Prior Publication Data

US 2021/0185472 A1    Jun. 17, 2021

Related U.S. Application Data

(63) Continuation of application No. 16/514,823, filed on Jul. 17, 2019, now Pat. No. 10,939,227, which is a
(Continued)

(51) Int. Cl.
*H04L 9/40* (2022.01)
*H04W 4/00* (2018.01)
(Continued)

(52) U.S. Cl.
CPC ............. *H04W 4/00* (2013.01); *H04L 9/3213* (2013.01); *H04L 63/0428* (2013.01);
(Continued)

(58) Field of Classification Search
None
See application file for complete search history.

(56) References Cited

U.S. PATENT DOCUMENTS

| | | | |
|---|---|---|---|
| 5,797,005 A * | 8/1998 | Bahls | G06F 9/546 |
| | | | 719/314 |
| 7,162,453 B1 * | 1/2007 | Tenorio | G06Q 20/382 |
| | | | 705/64 |

(Continued)

*Primary Examiner* — Joseph P Hirl
*Assistant Examiner* — Hassan Saadoun
(74) *Attorney, Agent, or Firm* — Dorsey & Whitney LLP

(57) ABSTRACT

According to one embodiment, a method of granting a remote device access to a smart home network connected device is disclosed. An example method includes receiving an access request including identifying information related to the remote device; generating a digital security token that is encrypted and provides the remote device with access to the smart home network connected device without divulging network credentials; transmitting the digital security token to the remote device; receiving the decrypted digital security token from the remote device, the decrypted digital security token validating permissions of the remote device to access the smart home network connected device; and transmitting a remote access authorization to the remote device based on the decrypted digital security token, the remote access authorization providing the remote device with access to the smart home network connected device to connect the smart home network connected device to the network.

17 Claims, 15 Drawing Sheets

Related U.S. Application Data continuation of application No. 15/242,930, filed on Aug. 22, 2016, now Pat. No. 10,397,731.

(60) Provisional application No. 62/208,380, filed on Aug. 21, 2015.

(51) Int. Cl.
| | | |
|---|---|---|
| *H04L 9/32* | (2006.01) | |
| *H04L 67/125* | (2022.01) | |
| *H04L 67/00* | (2022.01) | |
| *H04W 4/80* | (2018.01) | |

(52) U.S. Cl.
CPC .............. *H04L 63/08* (2013.01); *H04L 63/10* (2013.01); *H04L 63/20* (2013.01); *H04L 67/125* (2013.01); *H04L 67/34* (2013.01); *G05B 2219/2625* (2013.01); *H04W 4/80* (2018.02)

(56) References Cited

U.S. PATENT DOCUMENTS

| | | | |
|---|---|---|---|
| 8,111,154 B1* | 2/2012 | Puri | G08B 21/0202 340/539.13 |
| 10,397,731 B2 | 8/2019 | Klein et al. | |
| 10,939,227 B2 | 3/2021 | Klein et al. | |
| 2002/0180581 A1* | 12/2002 | Kamiwada | H04L 63/083 340/5.2 |
| 2008/0148351 A1* | 6/2008 | Bhatia | G06F 21/6218 726/2 |
| 2010/0125894 A1* | 5/2010 | Yasrebi | H04L 12/2818 726/4 |
| 2015/0223416 A1* | 8/2015 | Eng | A01G 25/167 700/284 |
| 2016/0232519 A1* | 8/2016 | Tenenboym | G06Q 20/38215 |

* cited by examiner

REMOTE AND SHARED ACCESS FOR NETWORK CONNECTED DEVICES

CROSS-REFERENCE TO RELATED APPLICATIONS

This application is a continuation of U.S. patent Ser. No. 16/514,823, filed Jul. 17, 2019, now U.S. Pat. No. 10,939,227 entitled "Remote and Shared Access for Network Connected Devices," which is a continuation of U.S. patent application Ser. No. 15/242,930, filed Aug. 22, 2016, now U.S. Pat. No. 10,397,731, issued Aug. 27, 2019, entitled "Remote and Shared Access for Sprinkler Systems," which claims the benefit of U.S. Provisional Patent Application Ser. No. 62/208,380, filed Aug. 21, 2015, entitled "Remote and Shared Access for Sprinkler Systems", all of which are hereby incorporated herein by reference in their entirety.

FIELD

This disclosure relates generally to landscaping sprinkler systems and more specifically methods and systems of remotely controlling landscaping sprinkler systems.

BACKGROUND

Traditional sprinkler systems include a sprinkler control system that is manually adjusted or deactivated by physically accessing the control system. In these types of systems, different sprinkler zones, valves, and other devices typically must be physically disabled at the control system. Because most control systems are located at a home or business, the home or business owner typically must be physically present to adjust the sprinkler system or allow another (e.g., maintenance or landscaper worker) access to the property and the control system. Due to this configuration, in instances of maintenance or malfunction, these systems often require scheduling coordination between the owner of the sprinkler system or property and maintenance personnel to allow the maintenance personnel physical access to the control system and deactivate, modify, or otherwise control or repair the sprinkler system.

Additionally, most sprinkler systems lack the flexibility to handle eccentric irrigation schedules. For example, a typical sprinkler system controller is able to handle only one or two irrigation schedules per zone. Adjusting the schedule on conventional sprinkler systems is time consuming and can result in vacillating between under-watering and overwatering.

Current automated sprinkler systems have attempted to bring some efficiency to this process by including sensors that keep track of local weather conditions. But, these devices typically require adjustment and expensive equipment for tracking rain, wind, humidity, etc. Additionally, the hardware can break or malfunction easily because of the exposure to the elements. Further, the sensors must be expertly placed to be effective. Even then, these systems can provide only meteorological input into determining any irrigation schedule adjustments and over-watering or under-watering can still result. Sensors can give readings that do not necessarily result in optimal irrigation and this problem is exacerbated when sensors are misplaced, even slightly.

Other automated sprinkler systems take into account historic and predicted weather data to adjust irrigation schedules. Such systems cannot accurately adjust irrigation cycles given that weather forecasts are often wrong or do not accurately reflect weather at the particular site. As a result, these systems can adjust irrigation cycles to the detriment of the landscape health. To compensate, these systems also often rely on sensors and, thus, suffer the same problems described above.

Some automated sprinkler controllers are capable of connecting to a media network. However, these device controllers are typically initially connected to the network using the homeowner's network credentials; e.g. input by the homeowner or an installer. Many homeowners may not be comfortable providing their personal network credentials to an installer or providing the installer with their personal device in order to set up the smart device. For example, a homeowner may not wish to tell their personal network password to an installer so that the installer can connect a sprinkler control system to the homeowner's wireless network.

SUMMARY

According to one embodiment, a method of controlling a sprinkler system is provided. The method includes receiving an access request to grant control of the sprinkler system to a device, responsive to receiving the access request, transmitting an authorization including a first digital security token, storing a local copy of the first digital security token, receiving a request to control the sprinkler system from the device, wherein the request includes a second digital security token, comparing the second digital security token to the local copy of the first digital security token to determine whether the second digital security token matches the local copy of the first digital security token, and responsive to determining that the second digital security token matches the local copy of the first digital security token, granting control of the sprinkler system to the device based.

In another embodiment, a method of controlling a sprinkler schedule is disclosed. The method includes receiving, by a processor, an instruction to determine an environmental variable in a geographical area for a specified time, retrieving, by the processor, the environmental variable from a remote computing system, determining, by the processor, whether the environmental variable exceeds a threshold amount for the area and the specified time, and scheduling, by the processor, a sprinkler event, based at least in part on whether the environmental variable exceeds the threshold amount.

In yet another embodiment, a system for providing shared control of a sprinkler system is disclosed. The system includes a sprinkler controller, a processor, and a computer readable memory device, having a plurality of program instructions stored thereon for execution by the processor. The program instructions comprise program instructions to receive an access request to provide shared control of the sprinkler controller with a first device, the access request including identifying information about the first device, program instructions to store the identifying information a list of authorized devices, program instructions to receive a request to control the sprinkler controller from a second device, the request including identifying information about the second device, program instructions to compare the identifying information about the second device to the identifying information about the first device to determine whether the identifying information about the second device matches the identifying information about the first device, and program instruction to provide shared control of the sprinkler controller to the second device, responsive to determining that the identifying information about the second device matches the identifying information about the first device.

In yet another embodiment, a method of connecting a sprinkler controller to a network is disclosed. The method includes transmitting, by a processor, a request for an encrypted token, the encrypted token comprising network credentials associated with an owner device of the sprinkler controller, receiving, by the processor, the encrypted token, decrypting, by the processor, the encrypted token to recover the network credentials, transmitting, by the processor, the network credentials to the sprinkler controller, and transmitting, by the processor, instructions to the sprinkler controller to provide the network credentials to a network access point to connect to the network.

In yet another embodiment, a method of granting a remote device access to a smart home network connected device is disclosed. The remote device is associated with a user other than an owner of the smart home network connected device, and the smart home network connected device is configured to connect to a network associated with the owner to control one or more devices over the network. The method includes receiving, from an owner device associated with the owner, an access request comprising identifying information related to the remote device; generating, by a processor, a digital security token, wherein the digital security token is encrypted and configured to provide the remote device with access to the smart home network connected device without divulging network credentials of the network; transmitting, by the processor, the digital security token to the remote device, wherein the remote device is configured to decrypt the digital security token; receiving, by the processor, the decrypted digital security token from the remote device, wherein the decrypted digital security token validates permissions of the remote device to access the smart home network connected device; and transmitting, by the processor, a remote access authorization to the remote device based on the decrypted digital security token, the remote access authorization providing the remote device with access to the smart home network connected device to connect the smart home network connected device to the network.

In yet another embodiment, a method of connecting a residential home maintenance device to a local network without knowledge of credentials of the local network is disclosed. The method includes transmitting, from a secondary device, a request for control of the residential home maintenance device, wherein the request comprises information identifying the secondary device as an authorized device; receiving, from a server over the local network, authorization to remotely access the residential home maintenance device, wherein the authorization comprises encrypted network access data such that the secondary device is unable to access the network access data; decrypting, by the secondary device, the encrypted network access data without divulging the network credentials to a user of the secondary device; and transmitting, from the secondary device, the decrypted network access data to the residential home maintenance device to connect the residential home maintenance device to the location network.

In yet another embodiment, a method of controlling a sprinkler schedule of a sprinkler system is disclosed. The method includes retrieving, by the processor, an environmental variable from a remote computing system a set time before a scheduled watering event, wherein the environmental variable retrieval time is linked to timing of the scheduled watering event; determining, by the processor, whether the environmental variable exceeds a threshold amount for the area and the specified time, wherein the threshold is based on an expected value of the environmental variable; and transmitting to the sprinkler controller, by the processor, a schedule for a sprinkler event, based at least in part on whether the environmental variable exceeds the threshold amount.

In an embodiment, a method for enabling control for a home network connected device is disclosed. The method includes receiving a shared access request for access to the home network connected device from a first user device associated with a first user, the shared access request including information related to a second user device that is unable to control the home network connected device; generating a user account for a second user associated with the second user device using the identifying information; transmitting shared access information corresponding to the home network connected device to the second user device; receiving a request to modify an operational characteristic of the home network connected device from the second user device; and operating the home network connected device based on the modified operational characteristic.

In another embodiment, a method for enabling temporary control of a home network connected device is disclosed. The method includes receiving a remote access request from an owner device, the remote access request comprising identification information corresponding to a user device and limit information on control of the home network connected device to be granted; generating a remote access authorization including information corresponding to the user device and the limit information; transmitting the remote access authorization to the user device; receiving a control request from the first user device, the control request including the remote access authorization and a modification of an operating parameter of the home network connected device; and based on verification of the remote access authorization, updating the home network connected device based on the modification of the operating parameter.

OVERVIEW

Figure 1:
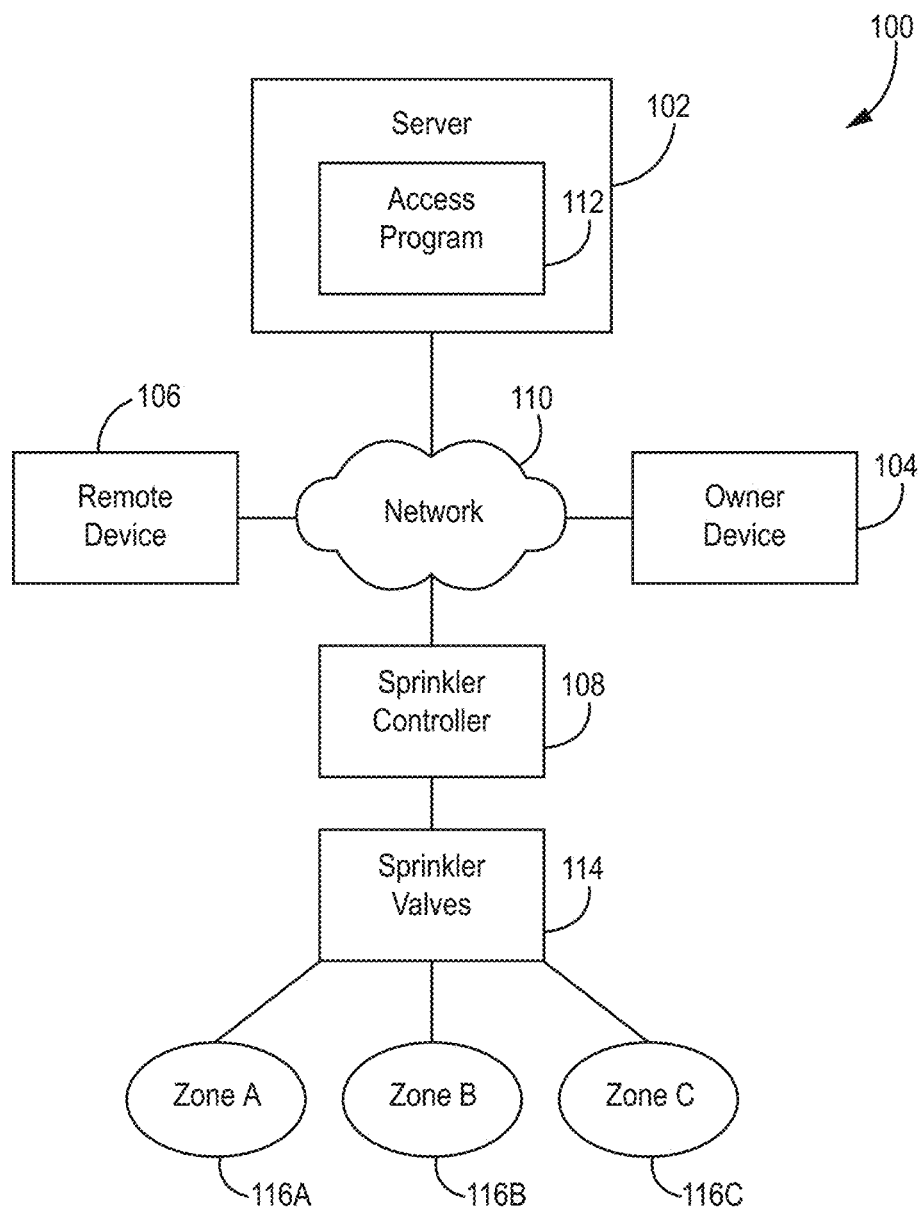
FIG. 1 is a functional block diagram of a distributed sprinkler control system for connecting to a remote device.

Embodiments described herein are directed to methods and systems for providing remote and/or shared access to multiple users in order to allow control of a sprinkler system. Remote and/or shared access can be either temporary or permanent and can be accessed through a number of electronic devices. For example, access can be granted via one or more applications including a native application, such as a downloaded application on a smart phone, or a web application that can be accessed through a web browser without any additional application download. As used herein the term "remote access" generally refers to temporary control of a sprinkler controller or other residential home maintenance device. The term "shared access" generally refers to permanent access and control of a sprinkler system or other smart home device system. In some instances, shared access is through a native application on a remote device. Control granted to the sprinkler controller includes access to substantially any functionality possessed by the owner including the ability to schedule events, activate/deactivate some or all sprinkler zones, etc. However, the access given can be varied or tiered such that certain levels or types of access have control of certain features, whereas other levels may have control of a subset of features.

According to other embodiments, methods and systems for remotely controlling a sprinkler system via a scheduling application are disclosed. The scheduling application can automatically set or reschedule sprinkler events (e.g., turning sprinklers on and off) based on, for example, past or predicted weather. The rescheduling can be based on threshold amount of change (e.g. precipitation or heat). If the weather or anticipated weather exceeds the threshold, then the programming can be adjusted.

Further, the disclosure includes methods for shared installation or repair of the sprinkler controller that provides access to a network without requiring knowledge of security credentials of the network. Some homeowners desire assistance in connecting a sprinkler controller to the network, such as with newly purchased controller. Security is a common concern of homeowners, and many homeowners may be uncomfortable providing a secondary user, such as an installation professional, with the wireless internet credentials (e.g., wireless network name, password, etc.) for their home network.

In one example, a method for granting a second user, such as an installer, the ability to connect the sprinkler controller to the owner's network without directly granting the secondary user access to the network itself. For example, the secondary user uses a remote computing device (e.g. that user's smartphone) to request access to a network (e.g., homeowner's WiFi). The network owner then enters the network credentials (e.g., network name and password) into their own computing device, such as a smart phone. The network credentials are encrypted by the owner's device, generating an encrypted token that is transmitted to the remote device of the secondary user. The secondary user connects locally to the sprinkler controller over a first communication pathway (e.g. hardwired connection or short-range radio wave). Once connected to the sprinkler controller, the remote device decrypts the token to recover the network credentials and transmits the network credentials to the sprinkler controller over the hardwire/short range connection. Alternatively, the encrypted credentials may be transmitted to the sprinkler controller, which may then decrypt them. In instances where the remote device decrypts the token, the decryption on the device may be sufficient only to transmit the credentials to the sprinkler controller, without allowing the secondary device view or otherwise access the credentials. Using the credentials, the sprinkler controller connects to the network and may complete the installation (e.g. connect to a server). In this manner, the sprinkler controller can be connected to the home network without the secondary user (or that user's device) having visibility or access to the security credentials, helping to retain the security integrity of the network.

DETAILED DESCRIPTION

Turning now to the figures, a sprinkler control system will now be discussed in more detail. FIG. 1 is a functional block diagram of a distributed sprinkler control system, designated 100. The sprinkler control system 100 generally includes a server 102, an owner device 104, a remote device 106, and a sprinkler controller 108, all connected over a network 110. The sprinkler controller 108 can be coupled to one or more sprinkler valves 114 or other water outlets, which are connected to one or more sprinkler zones, such as zone A 116A, zone B 116B, and zone C 116C (collectively referred to herein as "zones 116").

The network 110 is any type of network capable of transmitting data from one connected computing device to another. For example, the network 110 can be a local area network, a wide area network, a digital mobile network, an intranet, the Internet, or any other suitable data communication system. The network 110 can include wired connections, wireless connections, or a combination thereof. The network may typically be a WiFi network that can connect to a server or other cloud computing devices.

The server 102 is any programmable electronic device capable of communicating via the network 110 with other devices in the sprinkler control system 100. For example, the server 102 may be a server computer, a laptop computer, a tablet computer, a netbook computer, a personal computer, a smartphone, or a desktop computer. In another example, the server 102 may be a computing system utilizing clustered computers and components to act as a single pool of seamless resources, as is common in "cloud computing." The server 102 can include internal and external components, as depicted and described in further detail with respect to FIG. 9.

In the embodiment of FIG. 1, the server 102 includes an access program 112. The access program can be a computer program executed by one or more processors in the server 102. The access program 112 may, for example, provide an interface for receiving instructions from one or more devices via the network 110. In some embodiments, the access program 112 can be a portion of a larger controller application. In other embodiments, the access program 112 can be a stand-alone computer application. In some embodiments, the access program 112 can be a web application ("web app") accessible via the network 110 through a web browser or through a dedicated application stored on a device connected to the network 110. In various embodiments, the access program 112 can provide one or more devices connected to the network 110 with the ability to adjust, change, control, or otherwise modify the sprinkler controller 108 or any device settings thereof. Device access can be temporary, permanent, or at the discretion of a user. Exemplary embodiments of the access program 112 are discussed in further detail below with respect to FIGS. 2-5D.

The owner device 104 typically provides access to one or more functions or features of the sprinkler controller 108. The owner device 104 is a computing device and may be a server computer, a laptop computer, a tablet computer, a netbook computer, a personal computer, a smartphone, or a desktop computer. The owner device 104 can be a similar programmable electronic device as the server 102, but generally may have less storage and processing power and be more portable. In various embodiments, the owner device 104 can provide the access program 112 on server 102 with instructions to grant one or more remote devices (e.g., remote device 106) with the ability to remotely control the sprinkler controller 108 via the network 110. The owner device 104 is typically the device of the main user or owner of the sprinkler controller 108.

The remote device 106 is a computing device and may be substantially similar to the owner device 104. The remote device 106 can be granted permission to control the sprinkler controller 108 for a predefined or indefinite period of time. The remote device 106 can access the sprinkler controller 108 by communicating with the access program 112 stored on the server 102. The remote device 106 is typically controlled by a secondary or temporary user of the sprinkler controller 108.

The sprinkler controller 108 controls the sprinkler valves 114 and the various zones. Additionally, the sprinkler controller 108 communicates with one or more of the server 102, owner device 104, and/or remote device 106 either directly or indirectly, such as through the network 110. The sprinkler controller 108 can be any device capable of connecting to the network 108, communicating with other devices connected to the network 110 (e.g., the server 102, the owner device 104, and/or the remote device 106), and controlling one or more sprinkler valves, such as sprinkler valves 114. As used herein, controlling sprinkler valves includes turning sprinkler valves on, turning sprinkler valves off, adjusting water flow, pressure, or flow rate, to one or more sprinkler valves, or any other operation or action that affects the flow of water to the sprinkler valves. In various embodiments, the sprinkler controller 108 can receive instructions from one or more authorized devices connected to the network 110 control the sprinkler valves 114 based on the received instructions. In one embodiment, the sprinkler controller 108 is a specially programmed controller that can receive and store irrigation scheduling data, can receive instructions for running the sprinkler valves 114, and send signals for turning the sprinkler valves 114 off and on.

The sprinkler valves 114 can be any of commercially available sprinkler valves or specialty sprinkler valves. The sprinkler valves 114 may also include other types of water outlets, such as irrigation lines, hoses, shower heads, etc. In general, the sprinkler valves 114 can be any sprinkler valve capable of controlling water flow to one or more of the zones 116 based on instructions received from the sprinkler controller 114. For example, the sprinkler valves 114 can be ball valves, gate valves, check valves, automatic valves, or a combination thereof. The sprinkler valves 114 can receive electrical signals from the sprinkler controller 108 to open, close partially open or partially close one or more sprinkler valves. The sprinkler valves 114 may be in fluid communication with a water source. In various embodiments, the water source may provide a pressurized stream of water such that, when one or more of the sprinkler valves 114 is open, pressurized water is provided through the sprinkler valves 114 to the zones 116. In other embodiments, the sprinkler controller 108 can also control a main water valve which can selectively provide pressurized water to one or more of the sprinkler valves 114. Each of the zones 116 includes one or more nozzles for distributing water delivered to the nozzles by the sprinkler valves 114.

Figure 2:
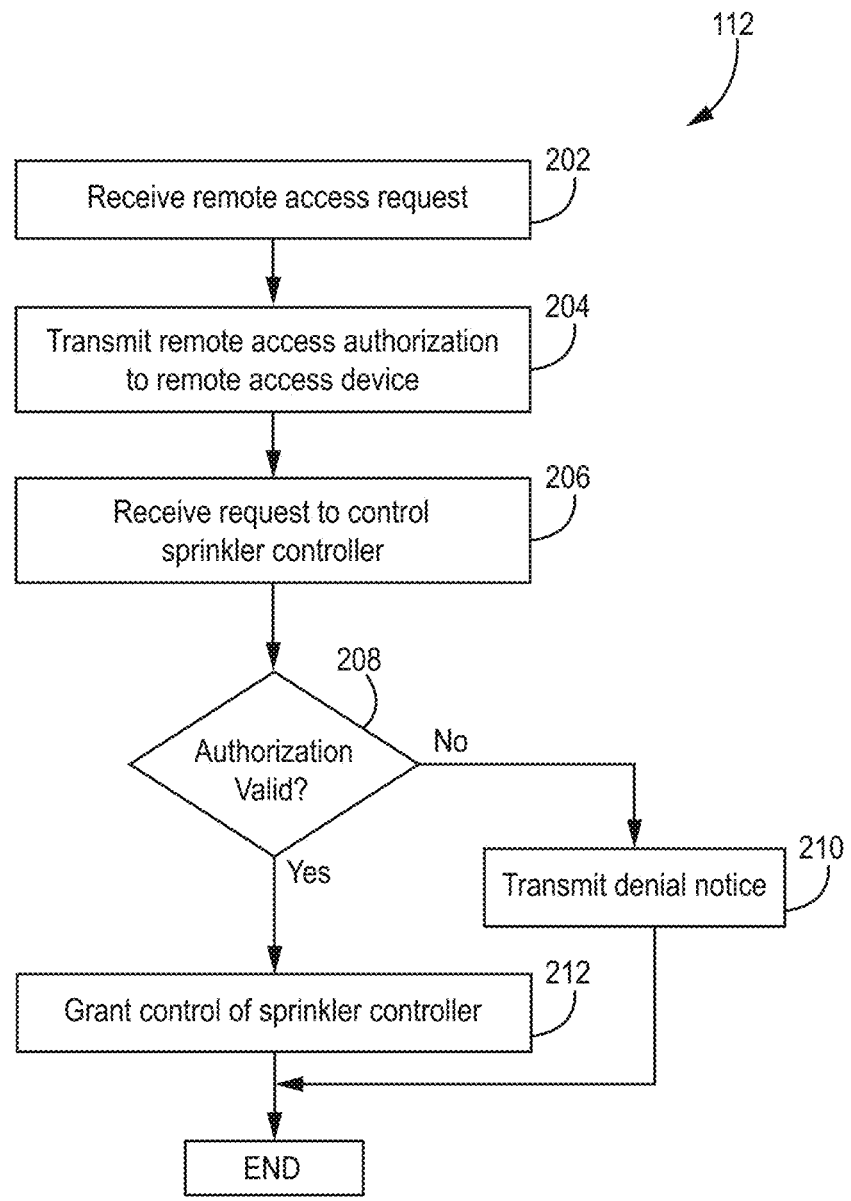
FIG. 2 is a flowchart illustrating a method of granting remote access to a sprinkler control system.

In the embodiment of FIG. 1, the server 102 may communicate with the owner device 104 and the remote device 106 via the access program 112 to provide remote access and control of the sprinkler controller 108 to the remote device 106. Remote access generally refers to temporary control of a sprinkler controller by a computing device other than the owner device 104 (i.e., the device tied to the main user or owner of the sprinkler controller). FIG. 2 is a flowchart illustrating a method of granting remote access to a sprinkler control system. In certain embodiments, the method of FIG. 2 may be embodied as a portion of the access program 112 executing on the server 102 of FIG. 1 and provides remote access to the remote device 106 to control the sprinkler controller 108 via a web app.

In operation 202, a processor executing the access program 112 receives a request for temporary access. Temporary access may enable the remote device 106 to control the sprinkler controller 108 via the network 110 for a limited duration of time or for a specific number of access requests. The temporary access request may be transmitted (directly or indirectly) from the owner device 104. For example, the owner device 104 can possess credentials for granting temporary access to the sprinkler controller 108 that can be used to authorize temporary access. Credentials may be granted to the owner device 104 when the device is registered with the access program 112, such as when the sprinkler controller is initially registered.

In one embodiment, an owner of the owner device 104 provides the temporary access request to the access program 112 via a graphical user interface associated with a native application or a web app. The temporary access request may include identifying information to allow the server to verify the secondary user identity, the system, a third party, timing window, and so on. For example, the temporary access request may include owner credentials such as a username and password, owner biometric information, a request to grant temporary control of the sprinkler controller 108 to the remote device 106, and/or an expiration date for the temporary access. The expiration date may be provided in any suitable format, such as a time period (e.g., 7 days, 5 days, etc.) or a specific date and/or time on which the temporary access expires. The request may be transmitted from the owner device 104 to the server 102 via the network 110.

The temporary access request may also include an identifier for connecting with or otherwise contacting the remote device 106. Examples of the identifier include an email address, a telephone number, or the like of a secondary user associated with the remote device 106. The information included in the temporary access request may be received in a single data packet, as a series of data packets, or based on one or more prompts provided by the access program 112 to the owner device 104. The information included in the temporary access request may also be stored in a memory device included in or accessible by the server 102. The information included in the temporary access request may be stored in a data structure, such as a list, a database, or the like.

As specific example, the owner uses the owner device 104 to log into a web app (e.g., the access program 112) by providing login credentials to the server 102. From the web app, the owner, via the owner device 104, requests that temporary control of the sprinkler controller 108 be granted to the remote device 106 by providing identifying information, such as a phone number or email address, to the access program 112. It is noted that the identifying information may correspond to a particular device (e.g., serial number), may correspond to a particular secondary user (e.g., email, name, etc.), or may be a combination of both hardware and remote user identifying information.

In operation 204, a processor executing the access program 112 generates a digital security token. In one embodiment, the digital security token may be a unique string of characters, such as letters and/or numbers, issued by a token provider (i.e., access program 112) to a token recipient (i.e., remote device 106). In another embodiment, the digital security token is an executable file. In yet another embodiment, the digital security token is an encapsulated postscript file.

The digital security token may be a one-time use token, multiple-use token, and/or may include an expiration date. The digital security token may be encrypted using shared secret or public-key encryption. In embodiments using shared secret encryption, the access program 112 may generate the digital security token and shared secret, such as a password, passphrase, a number, or an array of random bits, and provide the digital security token and the shared secret to the remote device 106. For example, the digital security token and shared secret may be included in a uniform resource identifier (URL) or hyperlink sent to the remote device 106. In embodiments using public key encryption, a large, random number is used to generate public keys and a private key.

The processing element executing the access program 112 uses the public key to encrypt the digital security token. The private key, stored on the remote device 106, decrypts the digital security token and provides the results back to the access program 112. The digital security token may then be used to validate the identity and/or permissions of the token recipient to access, control, modify, or otherwise manipulate certain device settings or devices, such as water flow controlled by the sprinkler controller 108. Other permissions may include, but are not limited to, turning individual zones 116 on and off, scheduling sprinkler events, setting rain delays in an existing sprinkler schedule, etc. The access program 112 may retain a local copy of the digital security token for comparison with a digital security token provided by the remote device 106 in a request to control the sprinkler controller 108. For example, the access program 112 may locally store the digital security token in a memory device of the server 102.

In operation 206, a processor executing the access program 112 transmits a remote access authorization to the remote device 106. The remote access authorization may be in the form of an email, text message, short message service (SMS) message, or other electronic communication to the remote device 106 based on the identifier received in operation 204. The remote access authorization may include a URL, hyperlink, or other link that when tapped, clicked, or entered into a system input (e.g., a web browser), allows the remote device 104 to interface with sprinkler controller 108 via the network 110 (e.g., through a web app executing on the server 102). For example, the remote access authorization may include transmission of the digital security token generated in operation 204 to the remote device 106. In some embodiments, the authorization may be transmitted in a two-step process. For example, the server 102 may transmit the authorization to the owner device 104, which may then transmit the remote device 106. In yet another example, the remote access authorization may be transmitted to a first intermediate device and then forwarded to the remote device 106. For example a service professional may have multiple devices, and the remote access authorization may be transmitted to one of the multiple devices and then forward to a second device of the multiple devices.

In operation 208, a processor executing access program 112 receives a request to control the sprinkler controller 108. The request to control the sprinkler controller 108 may be received from the remote device 106. In various embodiments, the secondary user of the remote device 106 can tap, click, select, or enter into a web browser or web app the remote access authorization received in operation 206. In one embodiment, the secondary user selects a hyperlink on a mobile screen interface of the remote device 106 and is automatically redirected to a web application, such as the access program 112. By selecting the hyperlink on the remote device 106, the secondary user instructs the remote device 106 to transmit a request to control the sprinkler controller 108, which is received by the access program 112. In various embodiments, the request to control the sprinkler controller 108 is accompanied by a copy of the digital security token provided in operation 206. As described above, the digital security token may be included as part of the hyperlink or URL that constitutes the remote access authorization.

In decision block 210, a processor executing the access program 112 determines whether the remote access authorization is valid. As discussed above, the remote access authorization may be in the form of a digital security token. In these instances, the access program 112 extracts the digital security token from the request for control and determines whether the digital security token is valid. For example, the server 102 may maintain a list, database, or other data structure (stored locally or remotely) containing issued digital security tokens as well as the expiration dates, permissions and other characteristics associated with each digital security code. The processor then compares the received digital security token with the list of issued tokens and confirm the digital security token was properly issued to the remote device 106 and that the digital security token has not yet expired (or already been used in the case of a one-time use token). It should be understood that the remote access authorization may be invalid, for example, for being expired, revoked the owner device 104, previously used, or any other appropriate reason.

If the processor determines that the remote access authorization is not valid (decision block 210, NO branch), then the processor transmits a denial notice to the remote device 106, in operation 212. For example, the denial notice may indicate that the remote access authorization is expired or contains incorrect information. The denial notice may be transmitted in any appropriate form, such as email, text message, SMS message, phone call, redirection to a webpage, or any other appropriate communication form. In some embodiments, the access program 112 may also transmit a notification to the owner device 104 informing the owner that an unauthorized attempt to gain access to the owner's sprinkler controller 108 was detected. For example, the access program 112 may transmit identifying information of the remote device 112, such as an associated email address, phone number, name, etc. In some examples, the owner device 104 may provide an override instruction to the access program 112 to grant access to the remote device 106 despite the failed verification in decision block 208.

In examples where the remote access authorization is not valid because a token has expired, the processor may optionally transmit an override option to the owner device 106 in optional operation 216 providing the option to extend the time period for using the digital security token to access the sprinkler controller 108. The processor may then determine if an override instruction is received in optional decision block 218. If the owner device 106 transmits an instruction to extend the time period for using the digital security token (decision block 218, YES branch) then the access program 112 may proceed to grant control of the sprinkler controller in operation 214. If the owner device 106 does not transmit an instruction to extend the time period for using the digital security token (decision block 218, NO branch), then the processor may transmit the denial notice in operation 212.

If the processor determines that the remote access authorization is valid (decision block 208, YES branch), then the processor grants control of the sprinkler controller 108 to the remote device 106 in operation 212. In various embodiments, the permissions and control capabilities granted to the remote device 106 may be determined by the digital security token as directed by the owner device 104 in transmitting the request for temporary access in operation 202.

Granting temporary access to a remote device as described with respect to FIG. 2 enables the owner of the sprinkler controller 108 to provide short term access to a remote user (or other secondary user), which may be convenient with respect to various scenarios in which the owner is not present at the site of the sprinkler controller 108. For example, temporary access may be useful for maintenance personnel, system updates, house-sitters, or any other situation in which the owner may want to provide another with short-term control over his or her sprinkler controller. Once temporary access is granted, the remote device 106 can selectively open or close the sprinkler valves 114 by controlling the sprinkler controller 108 through the access program 112. Additionally, the remote device 106 can set or delay a sprinkler event (e.g., a scheduled time during which the sprinkler valves 114 are open). By controlling the sprinkler controller 108, the remote device 106 can remotely deactivate the sprinkler valves 114 in order to perform maintenance, system updates, or other services to the sprinkler control system 100. In some embodiments, control may include full control of the sprinkler controller 108 (all owner abilities), limited control, or other functions (e.g., repair functions not available to the owner).

Figure 3:
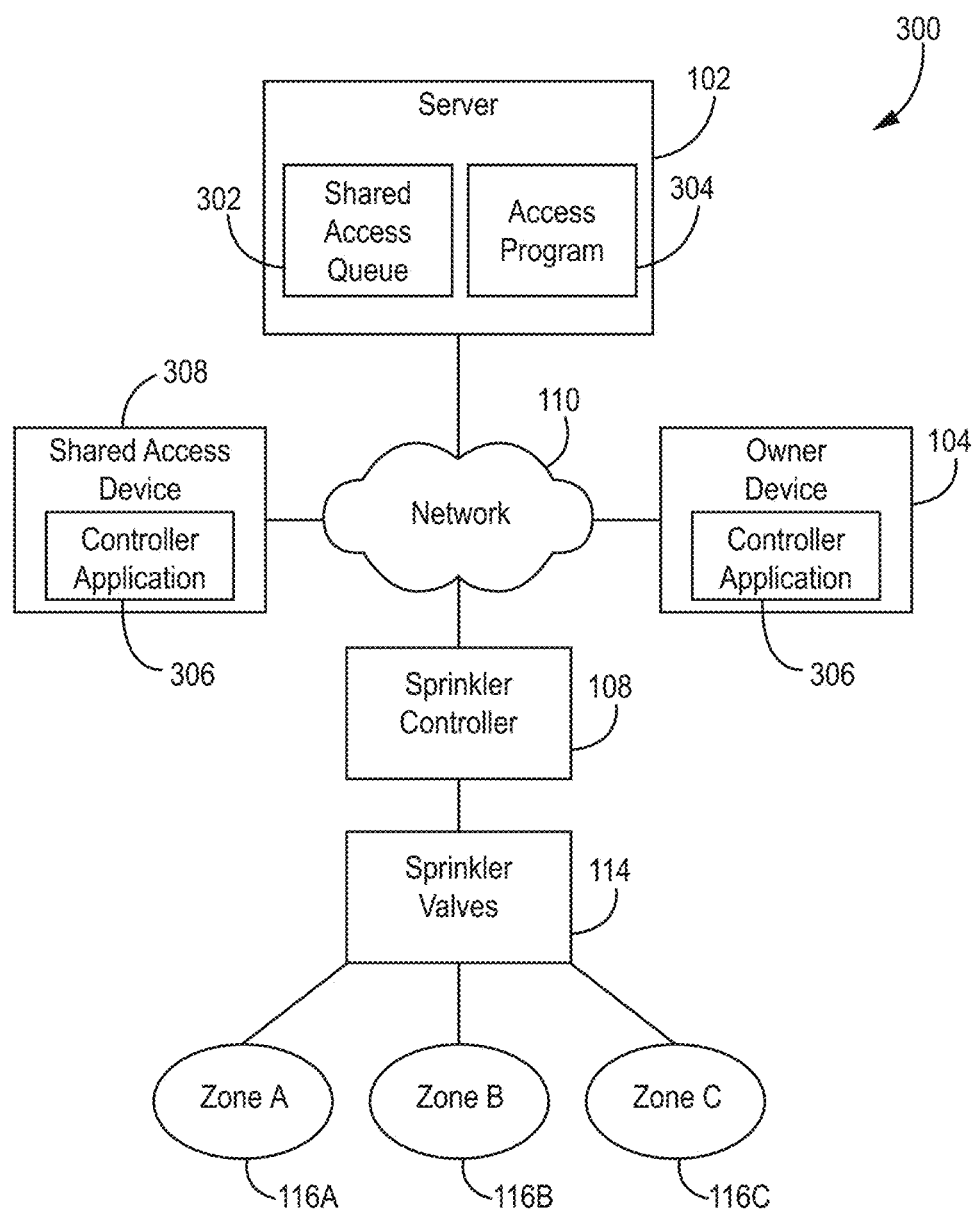
FIG. 3 is a functional block diagram of a distributed sprinkler control system for connecting to a shared access device.

According to another embodiment, the owner device 104 can provide remote access to a second device, which allows the second device to control the sprinkler controller 108 through a native application. FIG. 3 is a functional block diagram of a distributed sprinkler control system, generally designated 300. The sprinkler control system 300 includes similar components to the sprinkler control system 100 including the server 102, the owner device 104, the sprinkler controller 108, the sprinkler valves 114, and the zones 116. A detailed discussion of these components and devices is provided above with respect to FIG. 1. The sprinkler control system may further include one or more shared access devices 308. The shared access device 308 can be a server computer, a laptop computer, a tablet computer, a netbook computer, a personal computer (PC), a smartphone, or a desktop computer. In another embodiment, the shared access device 308 can represent a computing system utilizing clustered computers and components to act as a single pool of seamless resources, as is common in cloud computing. In general, the shared access device 308 can be any programmable electronic device capable of communicating via the network 110 with other devices in the sprinkler control system 300. In various embodiments, the shared access device 308 can communicate with the server 102 via the network 110. The shared access device 308 can be granted permission to control the sprinkler controller 108 via an application stored on the shared access device 308. In various embodiments, the shared access device 308 may be implemented as the remote device 106 described above with respect to FIG. 1.

The server 102 may include an optional shared access queue 302 and an access program 304. The access program 304 may be a set of program instructions for granting control of the sprinkler controller 108 through an application stored on the shared access device 308. An example embodiment of the access program 304 is described in more detail below with respect to FIG. 4. The shared access queue 302 may be a data structure, such as a list, for storing a list of shared access devices (identified, for example, by email address, phone number, etc.) to which shared access has been granted, but the shared access device does not yet have an account registered with the access program 304. By storing a list of devices to which permission has been granted, the access program 304 may automatically grant control of the sprinkler controller 108 to the shared access device 308 upon creation of an account by the shared access device 308 and future access by querying the database.

The owner device 104 and the shared access device 308 may each include a controller application 306. The controller application 306 may be stored and executed by the owner device 104 and/or the shared access device 308. In various embodiments, the controller application 306 may be a computer executable application and provide a user of a given device executing controller application 306 with an interface, such as a GUI, for providing instructions to and controlling the sprinkler controller 108. In some embodiments, a shared access user of the shared access device 308 may download, install, and launch the controller application 306 on the shared access device 308. The shared access user may then use the controller application 306 to create an account and communicate with the server 102 executing access program 304 via the network 110. Once an account is created, the access program 304 may provide the shared access device 308, executing the controller application 306, with the ability to control the sprinkler controller 108 via network 110.

The shared access device 308, via the native controller application 306 may access and control the sprinkler controller 108. The controller application 306 allows the shared access device to control the sprinkler controller 108 without navigating to a web page or a web application as described above with respect to FIGS. 1 and 2. Rather, the shared access device 308 may register an account with the server 102 that provides direct control of the sprinkler controller 108. The shared access device 308 can also be provided with indefinite control of the sprinkler controller 108. In contrast with the remote access device 106, which was granted a digital security token with set expiration parameters, the shared access device 308 can maintain control of the sprinkler controller 108 until explicitly revoked by the owner device 104. The amount of control granted to the shared access device 308 over the sprinkler controller 108 can be commensurate with that described above with respect to the remote device 106.

Figure 4:
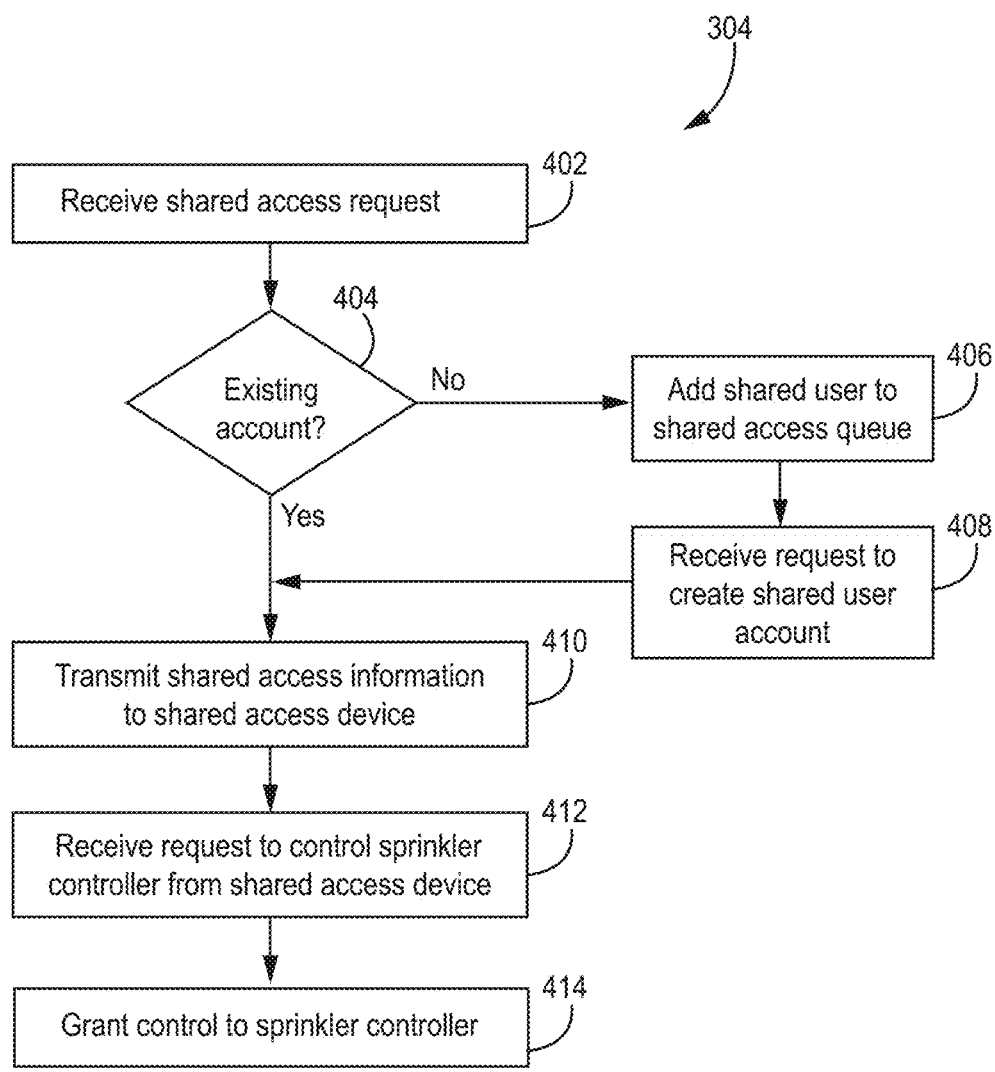
FIG. 4 is a flowchart illustrating a method of granting shared access to a sprinkler control system.

In order to grant control of the sprinkler controller 108 to the shared access device 308, the access program 304 receives a shared access request and confirms that the shared access device 308 has the proper credentials to control the sprinkler controller 108. FIG. 4 is a flowchart illustrating a method of granting shared access to a sprinkler control system. In various embodiments, the operations described with respect to FIG. 4 may be embodied, in whole or in part, as the access program 304 and executed by one or more processing elements.

In operation 402, a processor executing the access program 304 receives a shared access request to grant shared access. The shared access request may be received from the owner device 104 via network 110. For example, the owner may launch the controller application 306 on the owner device 104 and navigate a series of interface screens to transmit a request to the processor to grant shared access to a shared access device 308. The controller application 306 may prompt the owner to enter identifying information of the shared access device 308 via the owner device 104. For example, the owner may enter in an email address, telephone number, device number, serial number, or the like that is associated with the shared access device 308 or the shared access user. The owner device 104 may also include information in the shared access request specifying a particular level of control that the shared access device 308 has over the sprinkler controller 108. For example, the owner device 104 may specify that the shared access device 308 has the same ability to control the sprinkler controller 108 as the owner device 104. Alternatively, the owner device 104 may limit the powers granted to the shared access device 308. For example, the shared access device 308 may be empowered to schedule new sprinkler events, cancel sprinkler events, and delay events, but may be prohibited from granting shared access to additional devices. Once the identifying information is provided, the owner device 104 transmits the identifying information and any other relevant information (e.g., level of control granted) to the server 102 via network 110. The server 102 may receive the request and access program 304 executing on the server 102 may be provided with the request and identifying information.

In decision block 404, the processor determines whether the identifying information provided with the request is associated with an existing account. For example, the shared access device 308 may have already downloaded and launched the controller application 306 and created an account, identifying the shared access device 308 to the access program 304. In such embodiments, the processor may maintain a database of accounts and identifying information, such as name, address, username, email addresses, and/or telephone numbers, which may be used to identify account holders. The access program 304 may query the accounts database based on the received shared access request and the identifying information to determine whether the identifying information is associated with an existing account. If the access program 304 determines that the shared access device 308 is not associated with an existing account (decision block 404, NO branch), the access program 304 adds the identifying information of the shared access user to the shared access queue 302 in operation 406. The shared access queue 302 maintains a list of devices and/or shared access users that have been granted shared access via a shared access request from the owner device 104, but are not yet associated with an active account.

In operation 408, the access program 304 receives a request to create a shared user account. A shared access user of the shared access device 308 may download, install, and/or launch the controller application 306 and proceed to create a user account by entering identifying information corresponding to either themselves and/or an electronic device, such as a name, address, device serial number, email address or telephone number. The controller application 306 on the shared access device 308 may transmit the identifying information with the request to create a shared user account to the server 102 via the network 110. The server 102 may receive the request and provide the identifying information to the access program 304. The access program 304 compares the received identifying information to each entry in the shared access queue 302 to determine whether the identifying information has already been provided in a request to grant shared access and stored in the shared access queue 302. For example, when the shared access user creates an account via the controller application 306 accessed by the shared access device 308, the shared access user may input a telephone number as identifying information. The shared access device 308 transmits a request to create an account to the server 102 and includes the telephone number. Upon receiving the request and the telephone number, the access program 304 submits a query to the shared access queue 302 to determine if the telephone number has been previously received as identifying information in a received shared access request (see operation 402). If the identifying information was previously received as part of a shared access request, then the access program 304 proceeds to operation 410.

If the processor determines that the shared access device 308 is associated with an existing account (decision block 404, YES branch) or an account is created for a shared access device 308 identified in the shared access queue 302, then the processor transmits shared access information to the shared access device 308 in operation 410. Shared access information can include any information relating to the control of the sprinkler controller 108 granted to the shared access device 308. The processor may, for example, transmit a notification to the shared access device 308 indicating that the shared access device 308 has been granted shared access to control the sprinkler controller 108. The shared access information may also include information specifying the particular controls that the shared access device 308 has been granted (e.g., complete control of the sprinkler controller 108, specified powers to modify schedules, etc.). In another embodiment, the access program 304 can send a hyperlink or a URL to the shared access device 308. The hyperlink or URL may, when selected by the shared access user (e.g. clicked, tapped, touched, or otherwise activated), confirm to the access program 304 that the shared access device 308 has received the shared access information and accepted control of the sprinkler controller 108. In yet another embodiment, the access program may generate and send a digital security token having an indefinite duration.

In operation 412, the processor receives a request to control the sprinkler controller 108 from the shared access device 308. In various embodiments, a shared access user may launch the controller application 306 on the shared access device 308, and transmit a request to control, modify, or otherwise change a setting, schedule, or feature of the sprinkler controller 108. The shared access device 308 may transmit the request to the server 102 via the network 110. The request may also transmit a digital security token with the request to be validated by the access program 304. In operation 414, the processor grants control of the sprinkler controller 108 to the shared access device 308. The shared access device may then control the sprinkler controller 108 via an interface in the controller application 306. The access program 304 provides owners with the power to grant shared ability to control the sprinkler controller 108. By granting shared access, the owner may allow family members, close friends, house-sitters, or others to access and control the sprinkler controller 108, thus dividing the responsibility for managing the sprinkler controller 108.

Figure 5A:
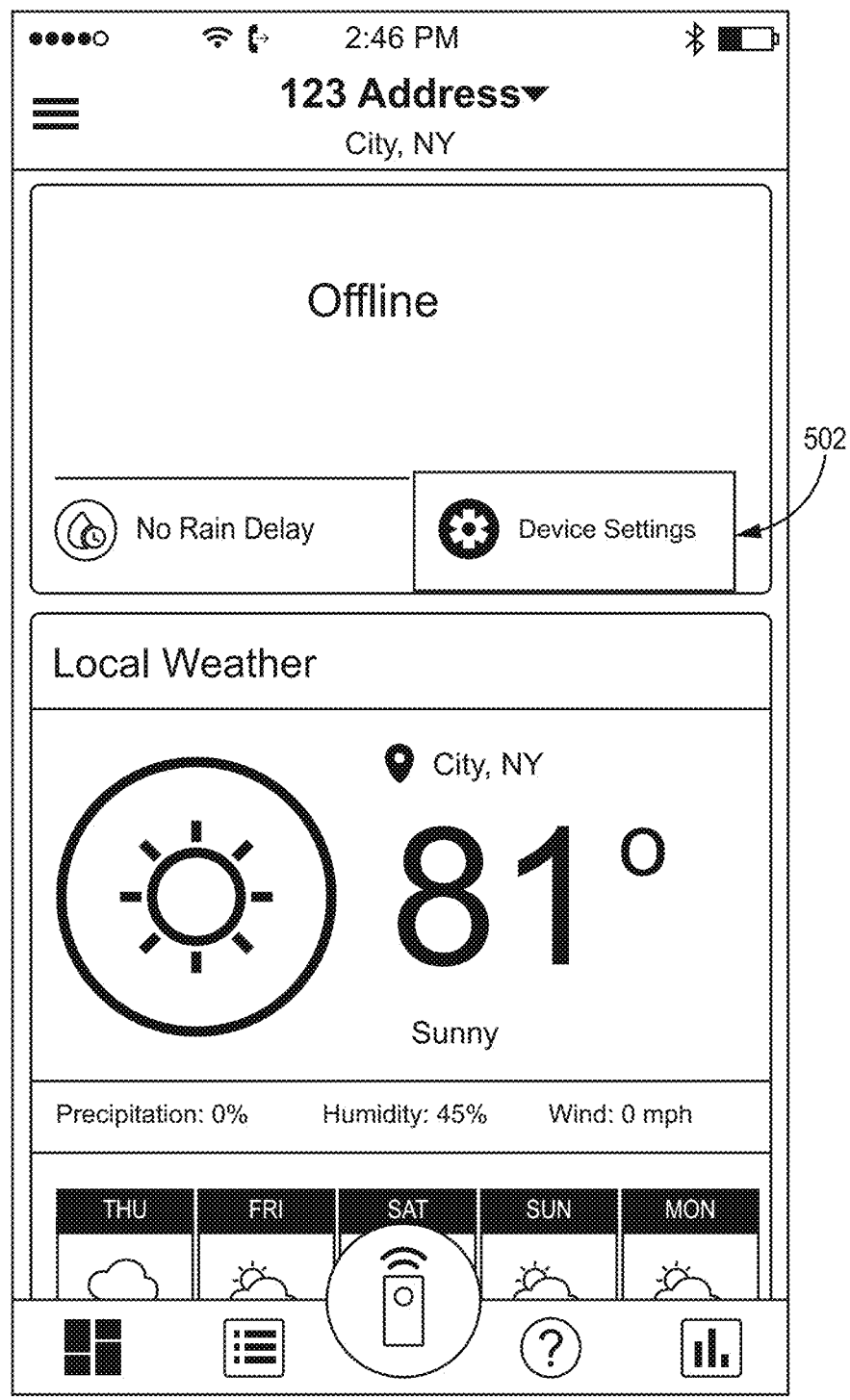
FIGS. 5A-5D are example screenshots of a user interface for granting shared access to a sprinkler control system.

FIGS. 5A-D are example screenshots of a user interface for granting shared access to a sprinkler control system. FIGS. 5A-D may, in some embodiments, represent a series of touch screen interfaces provided by the controller application 306 executing on the owner device 104 to allow the owner to grant shared access to the shared access device. FIG. 5A is an example user interface. The user interface includes a device settings icon 502 which may be selected by the owner to navigate to a device settings user interface.

Figure 5B:
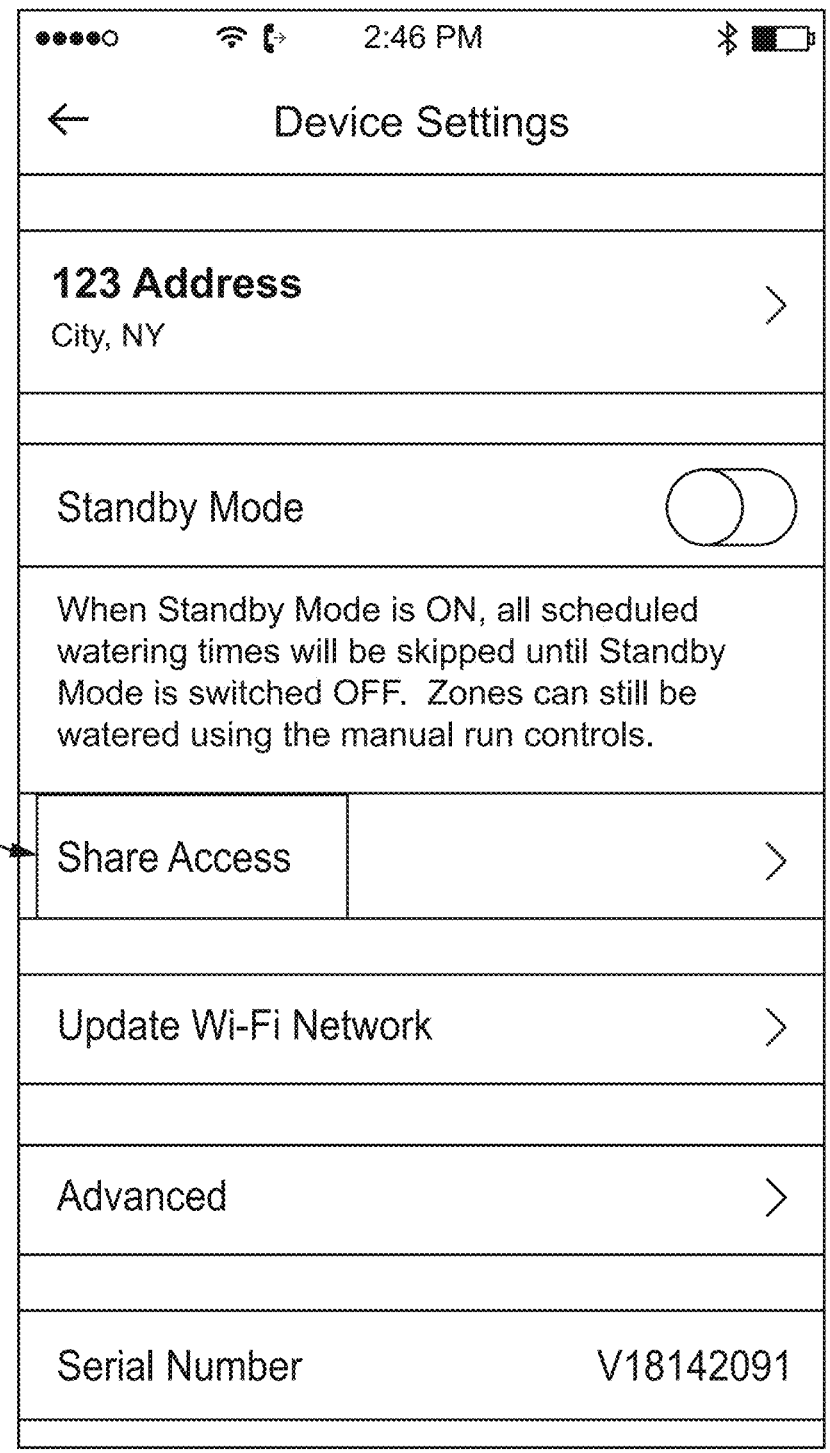
Figure 5C:
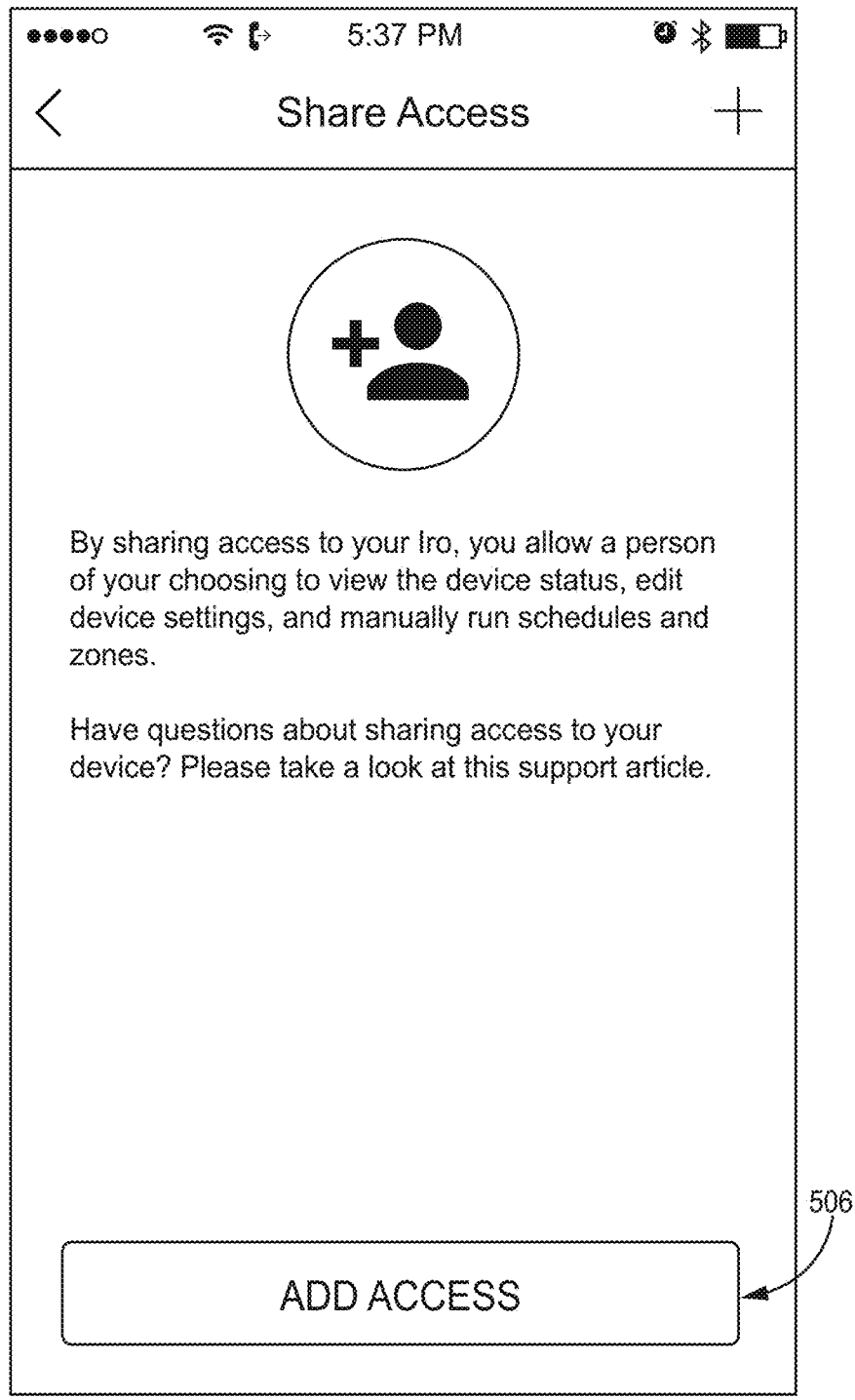
Figure 5D:
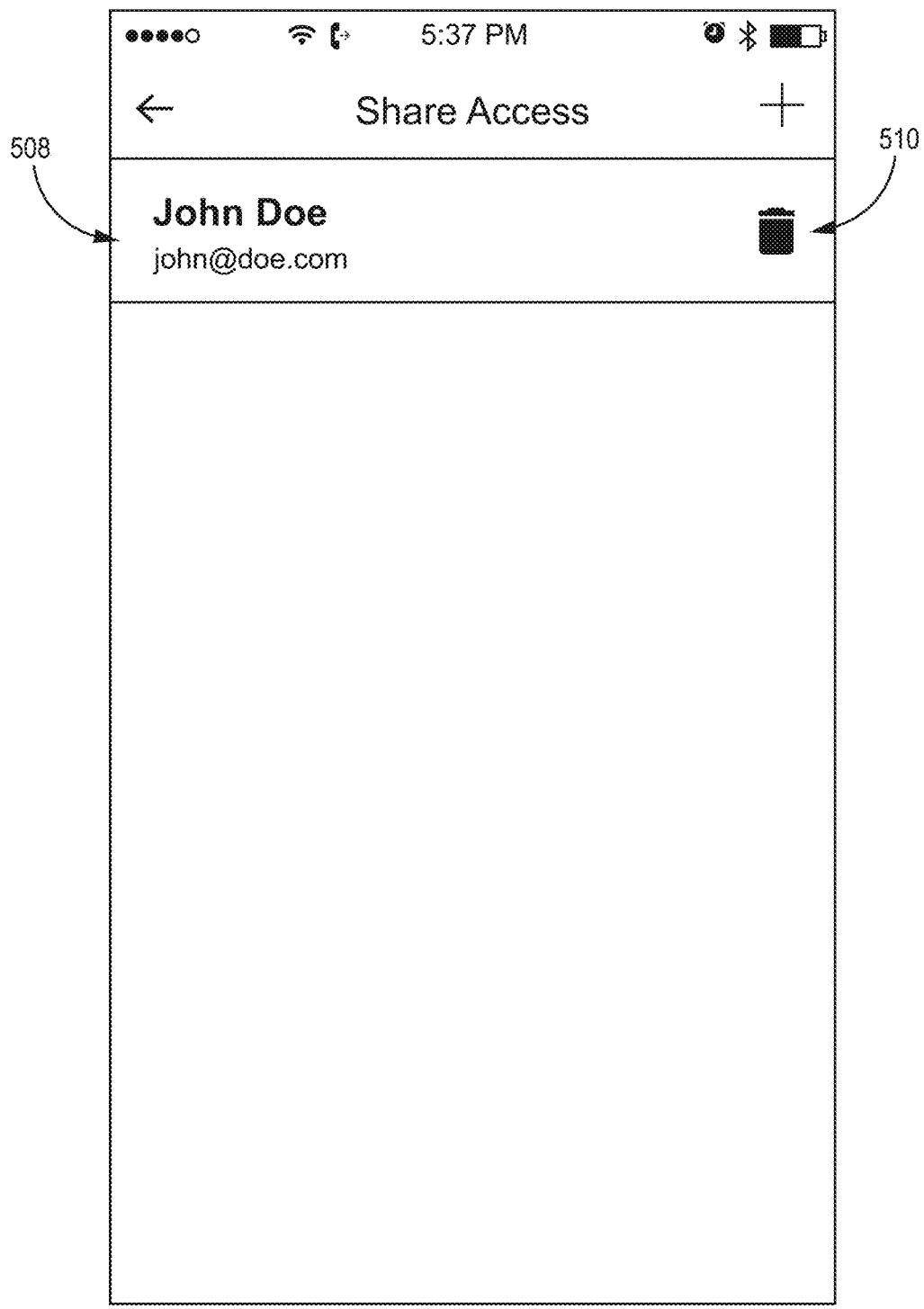

FIG. 5B is an example device settings user interface. The device settings user interface of FIG. 5B includes a share access icon 504, which may be selected by the owner to navigate to a share access user interface. FIG. 5C is an example share access user interface. The example share access user interface of FIG. 5C includes an add access icon 506, which may be selected by the owner to add a shared access device 308. By selecting the share access icon 506, the owner can input the identifying information of the shared access device 308, and transmit a request to grant shared access as described above with respect to FIG. 4. FIG. 5D is an example shared device list. The shared device list of FIG. 5D includes one or more devices or accounts with which control of the sprinkler controller 108 is shared. In the depicted example, the shared device list includes one entry 508, which includes a name and email address associated with the shared access device 308. The entry 508 also includes a delete icon 510, which may be selected by the owner to revoke the shared access from the shared access device 308 associated with the entry 508.

Figure 6:
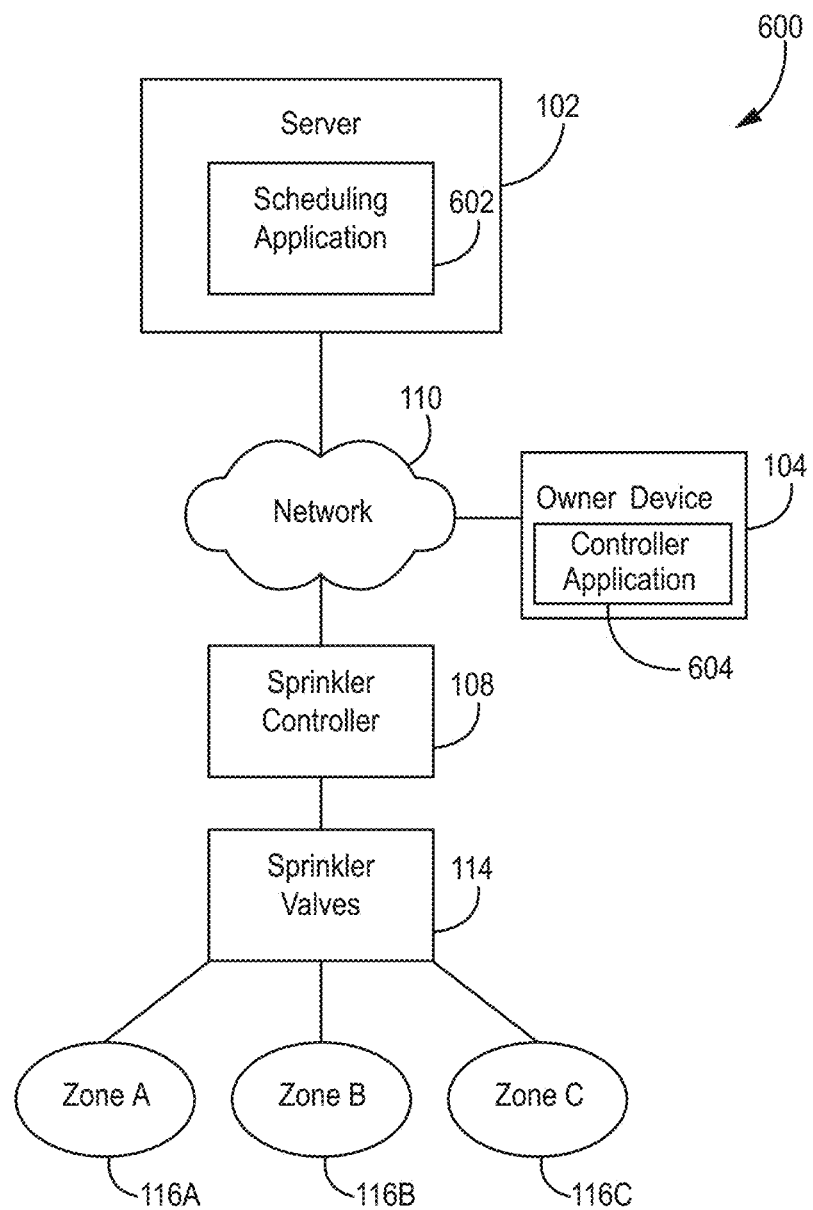
FIG. 6 is a functional block diagram of a distributed sprinkler control system having a scheduling application.

According to yet another embodiment, control of the sprinkler controller 108 may be shared with an automated or remote server (e.g., server 102), which can automatically set, reschedule, adjust, or modify sprinkler events. FIG. 6 is a functional block diagram of a distributed sprinkler control system, generally designated 600, for automatically adjusting scheduled sprinkler events through a remote server with access to a sprinkler controller. The sprinkler control system 600 generally includes similar devices and components as described above with respect to FIGS. 1 and 3, including a server 102, an owner device 104, and a sprinkler controller 108 all connected over the network 110. The sprinkler controller 108 may further be connected to the sprinkler valves 114, which control the zones 116.

The server 102 may include a scheduling application 602. The scheduling application 602 may access and control the sprinkler controller 108 via network 110. In various embodiments, the scheduling application 602 can include or access localized weather data to determine an amount of precipitation that an area in which the sprinkler controller 108 has received or is forecasted to receive. The scheduling application 602 may also reschedule or delay sprinkler events based on the localized weather data. The scheduling application 602 may also communicate with the owner device 104. For example, the scheduling application 602 can transmit a notification to the owner device 104 via the network 110 that the scheduling application 602 is rescheduling a sprinkler event and prompting the owner to override the rescheduling of the sprinkler event is desired.

The owner device 104 may include a controller application 604. The controller application 604 may be a stand-alone application executing on the owner device 104 and may provide the owner with the ability to communicate with and interact with the scheduling application 602. For example, the owner device 104 may receive a notification that based on localized weather data, the scheduling application is rescheduling a sprinkler event for the sprinkler controller 108. The controller application 604 may provide the owner with the ability to override the rescheduling of the sprinkler event. For example, the controller application 604 may display on the owner device 104 one or more options that, when selected by the owner, instruct the scheduling application 602 to return to the original schedule. Alternatively, the controller application 604 may provide the owner with the ability to manually reschedule sprinkler events for the sprinkler controller 108. For example, the controller application 604 may direct the owner to a user interface for scheduling sprinkler events. By interacting with the user interface, the owner device 104 may communicate a newly scheduled sprinkler event to the scheduling application 602, which controls the sprinkler controller in accordance with the newly scheduled event.

Figure 7:
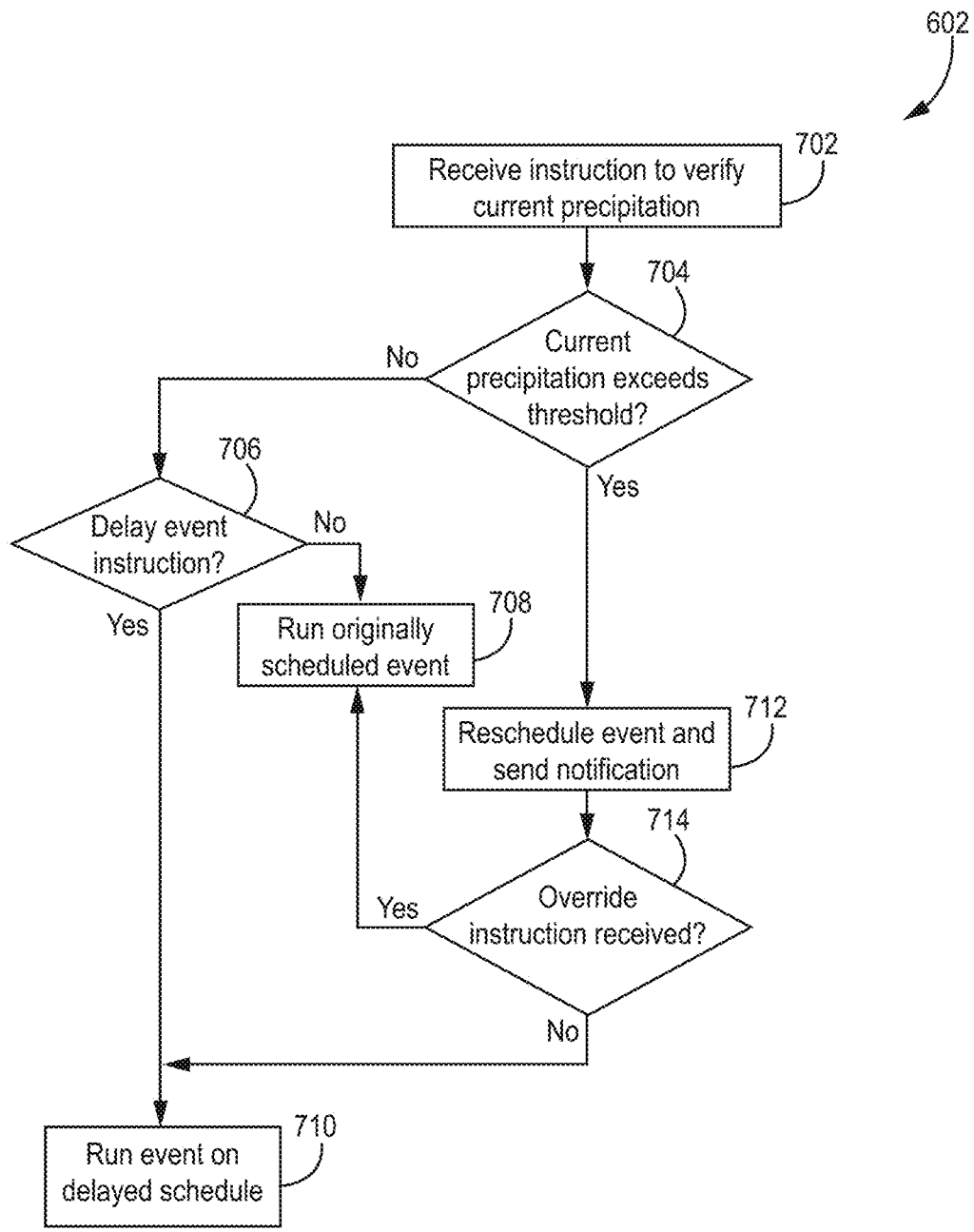
FIG. 7 is a flowchart depicting a method of managing a schedule for a sprinkler control system.

The server 102 executing the scheduling application 602 can selectively modify scheduled sprinkler events by controlling the sprinkler controller 108. Modification of the scheduled sprinkler events can be based on any number of relevant environmental factors or variables including, but not limited to, precipitation, temperature, cloud cover, humidity, etc. For simplicity, these environmental factors are referred to herein as precipitation, though those skilled in the art will appreciate that any number of relevant environmental factors can be considered. FIG. 7 is a flowchart depicting a method of managing a schedule for a sprinkler control system. In various embodiments, the method of FIG. 7 may be implemented, in whole or in part, as the scheduling program 602.

In operation 702, a processor executing the scheduling application 602 receives an instruction to verify the current precipitation in a localized area. In some embodiments, the scheduling application may be preprogrammed to automatically determine localized weather data for a particular area a set time before a scheduled sprinkler event. For example, the scheduling application may automatically check the recent or forecasted precipitation for the geographic area of the sprinkler control system 600 thirty minutes prior to a scheduled sprinkler event. In another embodiment, an owner may transmit, for example through the owner device 104, a request to check the localized weather data. In yet another embodiment, the instruction to verify the current precipitation may be received from a meteorological society or other third party that monitors weather patterns and data.

In operation 704, the processor determines whether the current precipitation in the area of the sprinkler controller 108 exceeds a threshold amount. The current precipitation may be a precipitation amount based on a certain time period and may include past precipitation and/or forecasted precipitation. For example, the current precipitation may include precipitation that has actually fallen in the hour preceding the scheduled sprinkler event. Alternatively, the current precipitation may be the forecasted precipitation for the hour following the sprinkler event. The current precipitation may also include the actual precipitation in the half hour preceding the sprinkler event and the forecasted precipitation for the half hour following the scheduled sprinkler event. Other time periods may also be used. The threshold amount may be predetermined and may be based on a number of factors including, but not limited to climate type, season, past weather events, forecasted weather events, geography, plant type, or any other relevant factors that affect the scheduling of sprinkler events. In an example embodiment, the processor compares the current precipitation to the threshold amount of precipitation and determines whether the current precipitation is greater than the threshold amount of precipitation. The threshold may be previously determined, may be set based on recent weather or precipitation (e.g., if the last 3 days included heavy precipitation the threshold may be lowered), or may be set by a user.

If the scheduling application 602 determines that the current precipitation does not exceed the threshold amount (decision block 704, NO branch), then the scheduling application 602 determines whether a delay event instruction was received in decision block 706. A delay event instruction may be received, for example, from the owner device 104, the remote device 106, or the shared access device 308. The delay event instruction may include, for example, instructions to cancel a scheduled sprinkler event or delay a scheduled sprinkler event for a certain amount of time (e.g., 1 hour). If the scheduling application 602 determines that no delay event instruction was received (decision block 706, NO branch), then the scheduling application 602 runs the regularly scheduled sprinkler event in operation 708. If the scheduling application 602 determines that a delay event instruction was received (decision block 706, YES branch), then the scheduling application 602 runs the sprinkler event on a delayed schedule as indicated by the delay event instruction, in operation 710.

If the scheduling application 602 determines that the current precipitation exceeds the threshold (decision block 704, YES branch), then the scheduling application 602 reschedules the sprinkler event and transmits a notification in operation 712. In various embodiments, the notification may be transmitted to the owner device 104, the remote device 106, and/or the shared access device 308. The notification may include an option for the recipient to override the rescheduling of the sprinkler event. When the owner selects this option, an override instruction will be transmitted back to the scheduling application 602 via the network 110.

In decision block 714, the scheduling application 602 determines whether an override instruction was received. In various embodiments, the scheduling application may periodically check to determine whether an override instruction was received. In other embodiments, the override instruction may be accompanied by an interrupt instruction to automatically reset the sprinkler event to its originally scheduled time. When the scheduling application 602 determines that an override instruction was received (decision block 714, YES branch), the scheduling application 602 resets the sprinkler event to its originally scheduled time and runs the originally scheduled event in operation 708. When the scheduling application 602 determines that no override instruction was received (decision block 714, NO branch), the scheduling application 602 runs the sprinkler event on the delayed schedule in operation 710.

By allowing for dynamic scheduling as described above with respect to FIG. 7, the scheduling application allows a sprinkler event schedule to automatically adjust for weather conditions so that water can be conserved. Using a threshold allows for the dynamic scheduling to take into account geographic, climate, and seasonal information about the sprinkler system 600, which may change over time, to provide a versatile scheduling function that does not require frequent updating from the owner. Additionally, it provides the owner with the ability to remotely adjust a sprinkler schedule based on local weather conditions, and determine whether the reported or forecasted weather is accurate for his or her particular sprinkler system.

Figure 8:
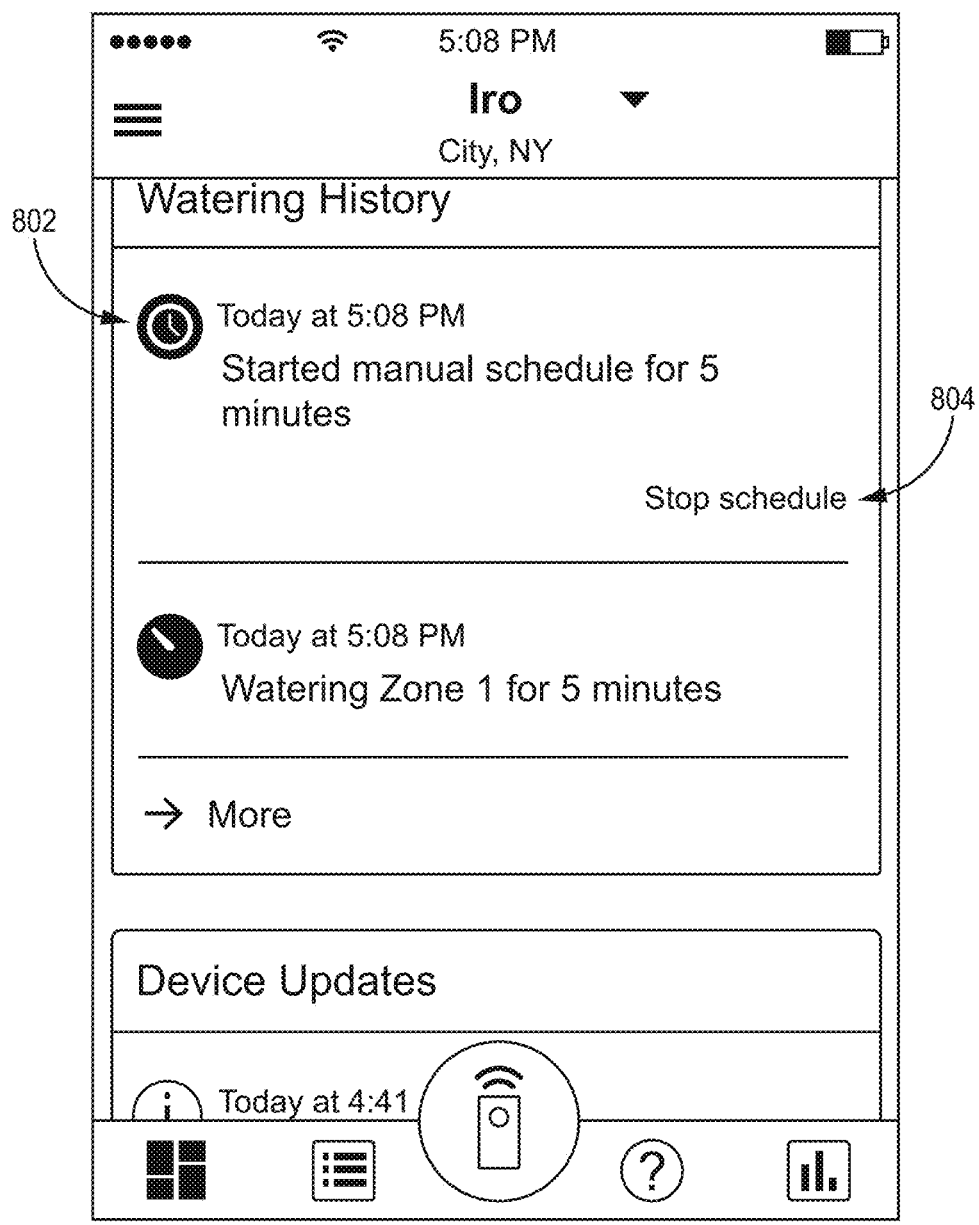
FIG. 8 is an example screenshot of a user interface for managing a schedule for a sprinkler control system.

FIG. 8 is an example screenshot of a user interface for managing a schedule for a sprinkler control system. As shown in FIG. 8, the user interface may include one or more notifications 802 of sprinkler events. The notifications 802 may include, for example, notifications that an event was scheduled, rescheduled, delayed, canceled, completed, etc. The notifications 802 may further include an edit icon 804, which may allow an owner, remote user, or shared access user to schedule, reschedule, delay, override a delay, cancel, or otherwise adjust a sprinkler event schedule. The user interface may further display past notifications 802 to provide the owner/remote user/shared access user with historical information in order to make more informed decisions regarding future sprinkler events.

Figure 9:
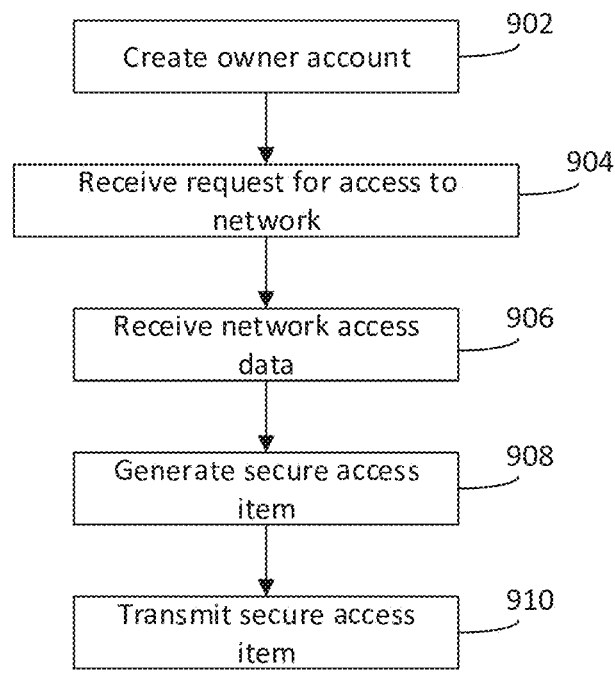
FIG. 9 is a flowchart depicting a method of providing access to a network for securely connecting a device to the network.
Figure 10:
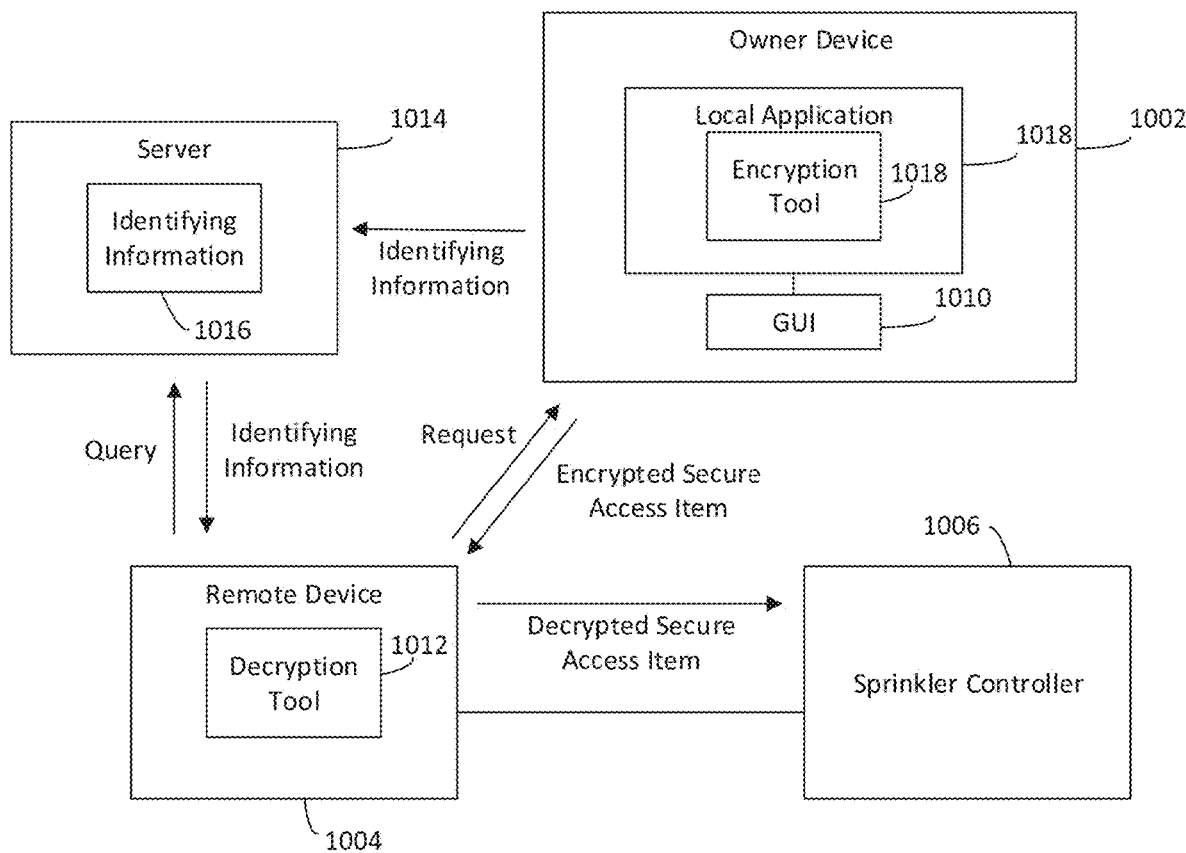
FIG. 10 is a data flow diagram for setting up a sprinkler control system using an encrypted token, in accordance with the embodiments of FIGS. 9 and 11.
Figure 11:
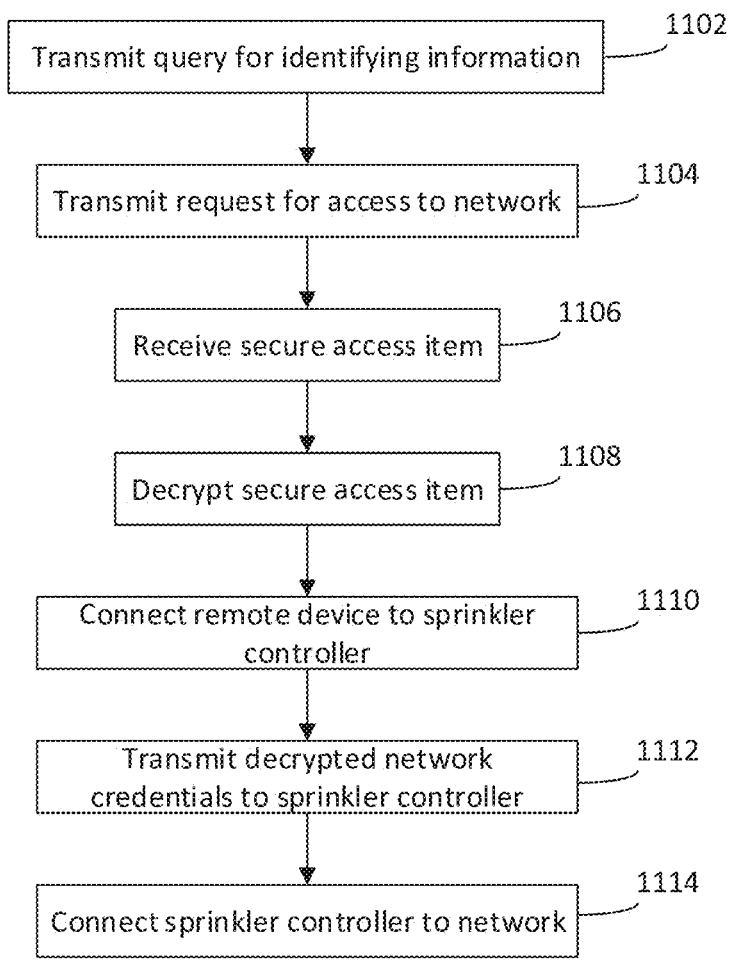
FIG. 11 is a flowchart illustrating a method of securely connecting a sprinkler controller to a network.

In some embodiments, a secondary user may be selected by the main user to install or otherwise adjust settings for the sprinkler controller. In instances where the sprinkler controller typically requires a network connection, a portion of the setup or setting adjustment may require knowledge of the local area network's security credentials or login information (e.g. a home WiFi network that the controller will connect to). However, the main user may not wish to provide this security information to the secondary user (or secondary device) for security or other reasons. FIG. 9 is a flowchart of a method for securely connecting device controller or other computing device to a location network, such as a local area network, without requiring knowledge by of network credentials The operations of FIGS. 9 and 11 are described in conjunction with FIG. 10. FIG. 10 is a data flow diagram for setting up a sprinkler control system.

With reference to FIG. 9, the method may begin with operation 902 and an owner of the owner device 1002 creates a user account. Creating the user account may include the owner providing identifying information about the owner and/or an owner device 1002 to the server. For example, as part of creating a user account, the owner may use a GUI 1010 to provide identifying information, such as the owner's name, address, email address, telephone number, device serial number, biometric information, or any other identifying information. The identifying information may be stored in a server 1014 as identifying information 1016. The identifying information 1016 may be stored, for example, in a searchable database or other data structure in the server 1014. The identifying information ties the owner device 1002 and owner to the sprinkler controller or other electronic device that is being installed or otherwise adjusted, such as a residential home maintenance device or a smart home network connected device. It should be noted that in some embodiments, such as instances where the owner may already include multiple controllers or where a secondary user is assisting in updating/adjusting a controller, this operation may be omitted or limited to providing new or updated information to the server 1014.

In operation 904, the owner device 1002 may receive a request for secure access to the location network or other request, such as an installation request that may in part require access to the location network. The request for secure access may be received from a remote or secondary device (e.g., remote device 1004) seeking access to the owner's location network in order to connect the sprinkler controller 1006 to the network. The remote device may be associated with a secondary or temporary user, such as an installer, neighbor, friend or relative, that is assisting the main user with installation or connecting of the controller.

The secure access request may be a text message, an email, an automated phone call, an invitation to visit a URL, a prompt to launch a local application, or any other type of communication. In response to the received request, the owner may use the GUI 1010 to navigate to a local application 1018 stored on the owner device 1002 or to navigate to a remote web application (e.g., by clicking or tapping a URL). For example, the request may include a hyperlink, button, or other graphical link to route the owner to the local application 1018 or the web application In operation 906, the owner device 1002 receives network access data. The network access data may be entered into the local application 1018 or through a web application. The network access data may be input by the owner by direct user input through the GUI 1010 or may be automatically retrieved from a storage device where the network access data was previously stored. For example, the network access data may be stored on the owner device 1002 and automatically retrieved in response to retrieving the request for secure access (e.g., in a network settings storage). The network access data may include, for example, network connection credentials such as a SSID, a network name, a network type, and a password for connecting to the network. Other network access data may also be provided, such as biometric information, answers to security questions, etc.

In operation 908, a secure access item is generated by the server, or the owner device responsive to receiving the network access data. The secure access item may be, for example, an encrypted token. The secure access item is transferrable between devices, but typically prevents users of the devices from accessing the underlying network credentials protected by the encrypted token. In one example, in operation 908, the local application 1018 (or web application) provides the network credentials to an encryption tool 1008. The encryption tool 1008 encrypts the network access data to generate the secure access item (e.g., an encrypted token). The encryption tool 1008 may be implemented with any type of encryption. For example, the encryption tool 1008 may use shared secret encryption (e.g. symmetric-key encryption) or public key encryption (e.g. asymmetric-key encryption). In embodiments implemented with shared secret encryption, the encryption tool 1008 may also provide a key for decrypting encrypted token. The key may be generated, for example, by a pseudorandom key generator. In embodiments implemented with public-key encryption, the network credentials may be encrypted using a private key specific to the owner device 1002.

The secure access item may also include identifying information specifying that the owner device 1002 is to retain control of the sprinkler controller 1006 once the sprinkler controller 1006 is connected to the network. In various embodiments, the sprinkler controller 1006 may default to control by whatever device is used to connect the sprinkler controller 1006 to the network. In the embodiments of FIG. 9-11, the remote device 1008 may be used to connect the sprinkler controller 1006 to the location network using the secure access item, but the owner may wish to retain control of the sprinkler controller 1006, once it is connected to the network. To override the default to the remote device 1004, the secure access item may include device information that, when received by the sprinkler controller 1006, designates the owner device 1002 as the controlling device rather than the remote device 1004. In one example, the device information is encrypted along with the network access data using the encryption key. In other examples, the device information is not encrypted and is simply transmitted to the remote device 1004 as an attachment to the secure access item or as metadata associated with the secure access item.

In operation 910, the owner device 1002 transmits the secure access item to the remote device 1004. The secure access item may be transferred over any connection between the owner device 1002 and the remote device 1004. For example, the secure access item may be transferred over a cellular network, a hardwire connection, the Internet, Bluetooth®, or other short range communication protocols, or generally any type of communication means and may be done directly or via the server. For example, the owner device may transmit the information to the server, which then transfers the secure access item to the remote device. The encrypted token may be accompanied by a decryption key for decrypting the encrypted token. Alternatively the decryption key may be transmitted separately from the encrypted token to improve the security of the encrypted token. The encrypted token and the decryption key may be transmitted substantially simultaneously, or at different points in time. For example, the decryption key may be generated before the encrypted token and provided to the remote device 1004 prior to generating the encrypted token. In some examples, the encrypted token and the decryption key may be transmitted to the remote device 1004 using the same or a different transmission means. For example, one of the encrypted token and the decryption key may be transmitted directly over a cellular network as an attachment to a text message while the other may be transmitted as an email attachment. Other communication channels may be used, such as direct transfer via a wired connection between the owner device 1002 and the remote device 1004. Alternatively, the encrypted token may be stored in and downloaded from a remote server (e.g., server 1014) than can be accessed by the remote device over a network, such as the Internet.

FIG. 11 is a flowchart illustrating a method of receiving network access to set up a sprinkler control system using an encrypted token. One or more of the operations described with respect to FIG. 11 may be performed prior to, contemporaneously with, or subsequent to one or more of the operations of FIG. 9.

In operation 1102, the remote device 1004 transmits a query for identifying information for the owner device 1002. The identifying information identifies owner 1002 device and enables the remote device 1004 to communicate with the owner device 1002. The remote device 1004 accesses the server 1014 and submits a query to the database storing identifying information about the owner. The remote device 1004 may submit a query to the database based on any identifying information regarding the owner. In one example, the remote device 1004 may submit a query to the database based on the name or the address of the owner. In response, the server may transmit additional identifying information, such as a telephone number or email address, associated with the owner to the remote device 1004. In some examples, operation 1102 may be omitted. For example, the remote device 1004 may have access to all of the identifying information without querying the database on the server 1014.

In operation 1104, the remote device 1004 transmits a request for an access to the server or directly to the owner device. The request for access may be transmitted as a text message, an email, or any other suitable communication technology between the remote device 1004 and the owner device 1002. For example, the remote device 1004 may use the telephone number of the owner to transmit a text message with the request for the encrypted token to the owner device 1002 over a cellular phone network. The request may include a hyperlink to visit a web application or a link that when activated opens the local application 1018 on the owner device 1002. The owner device 1002 may then the network access data as described above with respect to operation 906 in FIG. 9.

In operation 1106, the remote device 1004 receives the secure access item from the owner device 1002. The secure access item may be received, for example, as an attachment to a text message or an email. In another example, the secure access item may be transmitted directly over a wired connection between the remote device 1004 and the owner device 1002. Alternatively, the secure access item may be stored in and downloaded by the remote device 1004 from a remote server than can be accessed by the remote device 1004 over a network, such as the Internet. The remote device 1004 may also receive a decryption key for retrieving the network access data from the secure access item in conjunction with receiving the secure access item. The decryption key may be received in the same manner as the secure access item or in a different manner. For example, the secure access item may be transmitted as an attachment to a text message, while the decryption key may be transmitted to the remote device 1004 directly over a wired connection between the owner device 1002 and the remote device 1004.

In operation 1108, the remote device 1004 may decrypt the encrypted token. The remote device 1104 may provide the encrypted token to a decryption tool 1012, which recovers the network credentials based on the encrypted token and the decryption key. The decryption tool 1012 may decrypt the encrypted token using the decryption key based on the type of encryption used to generate the encrypted token (e.g., using shared secret encryption or public-key encryption). The remote device 1004 may store the network credentials in temporary storage within the remote device 1004. The remote device 1004 may do so without displaying the network credentials to the remote user of remote user device 1104 or without using the network credentials to connect the remote device 1004 to the network. Thus, the remote device 1004 may acquire the network credentials necessary to connect the sprinkler controller to the network without divulging the network credentials to the remote user of the owner device 1004 or connecting the remote device 1004 to the network.

In another example, the remote device 1004 may include an application that allows the device to connect to the network using the secured network credentials, but within a limited environment. In this example, the other programs and functions in the remote device may be disabled or otherwise separated from the setup application. The setup application then decrypts the network credentials, connects the device to the network, and uses the network connection to complete the remaining installation or settings adjustment for the controller. In this example, the remote device may "use" the credentials to access the network, but may not have visibility to the credentials as the name and password (or the like) may be hidden or obscured. In some embodiments, the credentials may be decrypted for a short period of time (e.g., 1 hour) to allow the remote device to access the network and then may expired and automatically delete from the remote device.

In operation 1110, the remote device 1004 is connected to the sprinkler controller 1106 defining a first communication path. In one example, the remote device 1004 may be communicatively coupled to the sprinkler controller using a short range wireless communication protocol. For example, the remote device 1104 may communicate with the sprinkler controller 1006 over Bluetooth®, ZigBee®, radio frequency modules, or other short range wireless communication connections. In another example, the remote device 1004 may connect to the sprinkler controller 1006 directly via a hardwire connection. For example, the remote device 1004 may be coupled to the sprinkler controller 1006 by an Ethernet cable, a lightning cable, a Fire wire cable, an HDMI, mini HDMI, or micro HDMI cable, a universal serial bus, or any other wired connection for transferring information between the remote device 1004 and the sprinkler controller 1006. In another example, the remote device 1004 may connect to the sprinkler controller 1006 via a third device, such as a smart device that is capable of communicating with both the remote device 1004 and the sprinkler controller 1006.

In operation 1112, the remote device 1004 transmits the decrypted network access data to the sprinkler controller 1006 via the connection established in operation 1110. For example the network access data may be transmitted over the short range wireless communication connection or directly over the wired connection. The remote device 1004 may also transmit the device information identifying the owner device 1002 as the owner of the controller 1006 so that control is retained by the owner device 1002 after the sprinkler controller 1006 is connected to the network.

In operation 1112, the remote device 1004 connects the sprinkler controller 1006 to the network. The remote device 1004 transmits instructions to the sprinkler controller to probe for an existing network using the network credentials. For example, the sprinkler controller 1006 may scan for networks, such as a Wi-Fi network having an SSID that matches the SSID identified in the network access data. The remote device 1006 may then transmit instructions to the sprinkler controller 1006 to request to join the identified network and to provide the password provided in the network access data when prompted by a network access point, such as a router, to provide a password. Once the sprinkler controller 1006 is connected to the network establishing a second communication pathway, the owner device 1004 or the remote device 1006 may be used to control the sprinkler controller 1006 to schedule sprinkling events, or connect sprinklers to the sprinkler controller 1006, or the like.

In an alternative embodiment, the decryption tool 1012 may be stored on the sprinkler controller 1006. In this embodiment, the remote device 1004 does not decrypt the secure access item. Rather, the remote device 1004 connects to the sprinkler controller 1006 via the first communication pathway as described above in operation 1110, and provides the secure access item to the sprinkler controller 1006. The sprinkler controller 1006 then provides the secure access item to the decryption tool 1012 to recover the network access data. The sprinkler controller 1006 may store the recovered network access data locally to use in connecting to the network. Once the sprinkler controller 1006 has recovered the network access data, the remote device 1004 may provide instructions to connect the sprinkler controller 1006 to the network, as described above with respect to operation 1012. This embodiment provides an additional layer of security as the remote device 1004 only handles the network access data when it is encrypted as the secure access item and does not decrypt the secure access item or include the decryption tool 1012 needed to decrypt the network access data.

The embodiments of described above with respect to FIGS. 9-11 allow network owners to allow others access to their network without divulging sensitive personal information, such as network passwords. For example, embodiments allow owners to defer to installers to connect the sprinkler controller 1006 to the network without providing any sensitive personal data to the installers. Additionally, embodiments enable the owners to retain control of the sprinkler controller without allowing the installers to use the owner's personal device.

Using the systems and methods described herein an owner of a controller can have a secondary or other user access the controller to adjust settings, install the controller, or the like, while still limiting the access and control granted to the secondary user. As a first example, both the main owner and the secondary user have separate user accounts on a controller database or server. The secondary user can then search for the main user account using various information (e.g., name, email address, home address, users near his or her location, etc.). Once the secondary user identifies a record corresponding to the main user, the secondary user requests access to a location corresponding to the controller. The location request may include access to the location's WiFi, as well as specific permissions related to the controller (e.g., yard attribute and create a schedule).

The location request may then be transmitted in the form of a notification (e.g., email, in-app, text, etc.), to the main user on his or her device, the notification includes the request from the secondary user for access. The main user may then be prompted through his or her device to set up components the secondary or installing user is requesting, such as location information and WiFi information, along with permission to access the yard and schedule settings of the controller. The main user may then enter the location, home address (or location of the controller), and provide the WiFi information into the main user device via the device application. The user device or the server may then translate the WiFi information into an encrypted token that can be used by the secondary user (or other users) with appropriate permissions. The token, when passed to another user, is decrypted, and will allow the secondary user to connect to the controller using the token system, rather than requiring entry of the WiFi information directly. Once the WiFi is set up on the controller, the main user may also grant access to other settings within the controller to the secondary user (e.g., yard and scheduling). The secondary user may then receive a notification that the access is granted and complete the installation of the controller.

In another example, the main user may not want to provide access to the WiFi at the controller location. In this example, the main user may grant access to only control of certain controller settings, such as yard and scheduling settings. In this example, a secondary user can set up zones for the controller and create a watering schedule for the zones for the controller and enter these into the server, tying them to the specific controller. The controller may not receive any specific scheduling or setting changes from the server until the main user connects the controller (either directly or through the server) to the WiFi by providing the WiFi information to the controller. In this case, the controller may run default schedules until it connects to the server and receives the tailored schedules set up by the secondary user. In this application, the main user may receive notifications from time to time that the settings set up by the secondary user have not yet been synchronized to the controller and the controller needs to be connected to the WiFi in order to complete the process.

In yet another example, the main user may not want to be involved with the setup or settings adjusting of the controller in any manner. In this example, the secondary user may set up the controller under the secondary user account (e.g., set the location, yard, and schedule). The secondary user will send a notification via the server to the main user to request the main user to visit a secure URL or other location on his or her device in order to allow the user to directly enter in the WiFi information. This information may then be tokenized and made available to the secondary user's device to transmit to the controller to complete the settings adjustment and connectivity for the controller to the server via the WiFi.

Figure 12:
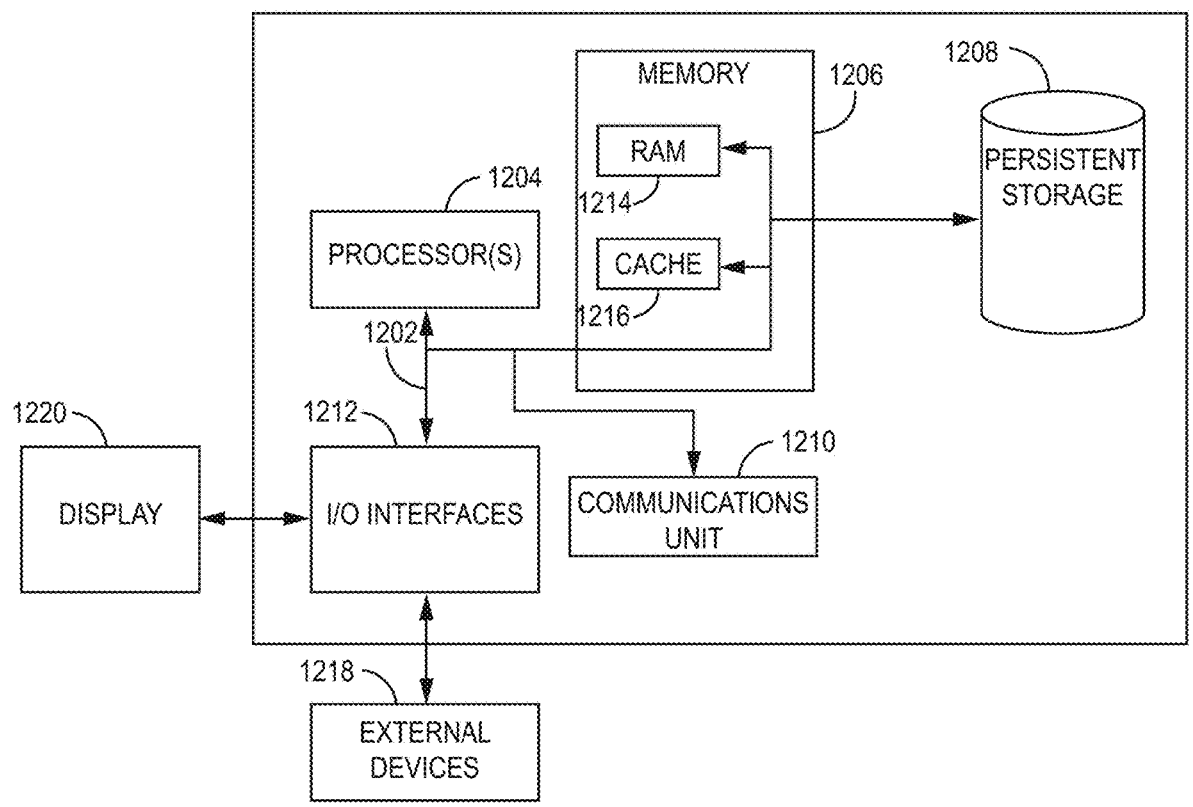
FIG. 12 is a functional block diagram of exemplary components of the server of FIG. 1.

FIG. 12 depicts a block diagram of components of the server 102, in accordance with an illustrative embodiment of the present invention. It should be appreciated that FIG. 12 provides only an illustration of one implementation and does not imply any limitations with regard to the environments in which different embodiments can be implemented. Many modifications to the depicted environment can be made.

The server 102 includes communications fabric 1202, which provides communications between computer processor(s) 1204, memory 1206, persistent storage 1208, communications unit 1210, and input/output (I/O) interface(s) 1212. Communications fabric 1202 can be implemented with any architecture designed for passing data and/or control information between processors (such as microprocessors, communications and network processors, etc.), system memory, peripheral devices, and any other hardware components within a system. For example, communications fabric 1202 can be implemented with one or more buses.

Memory 1206 and persistent storage 1208 are computer-readable storage media. In this embodiment, memory 1206 includes random access memory (RAM) 1214 and cache memory 1216. In general, memory 1206 can include any suitable volatile or non-volatile computer-readable storage media.

The access program 112, the access program 304, the shared access queue 302 and/or the scheduling application 602 can be stored in persistent storage 1208 for execution by one or more of the respective computer processors 1204 via one or more memories of memory 1206. In this embodiment, persistent storage 1208 includes a magnetic hard disk drive. Alternatively, or in addition to a magnetic hard disk drive, persistent storage 1208 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 1208 can also be removable. For example, a removable hard drive can be used for persistent storage 1208. Other examples include optical and magnetic disks, thumb drives, and smart cards that are inserted into a drive for transfer onto another computer-readable storage medium that is also part of persistent storage 1208.

Communications unit 1210, in these examples, provides for communications with other data processing systems or devices, for example the owner device 104, the remote device 106, the sprinkler controller 108, and/or the shared access device 308. In these examples, communications unit 1210 includes one or more network interface cards and one or more near field communication devices. Communications unit 1210 can provide communications through the use of either or both physical and wireless communications links. Computer programs and processes can be downloaded to persistent storage 1208 through communications unit 1210.

I/O interface(s) 1212 allows for input and output of data with other devices that can be connected to the server 102. For example, I/O interface 1212 can provide a connection to external devices 1218 such as a keyboard, keypad, a touch screen, a camera, and/or some other suitable input device. External devices 1218 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 1208 via I/O interface(s) 1212. I/O interface(s) 1212 can also connect to a display 1220.

Display 1220 provides a mechanism to display data to a user and can be, for example, an embedded display screen, liquid crystal display, and may include one or more input functions, such as a touch screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although various embodiments described herein relate to sprinkler controllers, they may be applied in various other devices; such as smart home devices, other residential home maintenance devices, or other computing devices. For example, many smart home devices require installation and input of the home or local area network information. The methods described herein for establishing communication pathways between the owner, secondary users, and a network device can be applied to these situations to allow installers of substantially any type of network connected device to be setup by an installer without providing access to the network information to the installer. As such, the description of any example is meant as illustrative only.

What is claimed is:

1. A method for enabling control for a home network connected device comprising:
   receiving a shared access request for access to the home network connected device from a first user device associated with a first user, the shared access request comprising identifying information related to a second user device that is unable to control the home network connected device;
   generating a user account for a second user associated with the second user device using the identifying information;
   transmitting shared access information corresponding to the home network connected device to the second user device,
   receiving a request to modify an operational characteristic of the home network connected device from the second user device; and
   operating the home network connected device based on the modified operational characteristic.

2. The method of claim 1, wherein the shared access information comprises control information for a level of control granted for the home network connected device.

3. The method of claim 2, wherein the level of control granted is less than an owner level of control corresponding to the first user.

4. The method of claim 1, wherein the shared access information specifies operational characteristics able to be controlled by the second user device.

5. The method of claim 1, wherein generating a user account for the second user comprises:
   receiving user information from the second user device; and
   verifying the user information matches the identifying information.

6. The method of claim 1, wherein the home network connected device is a sprinkler controller and the operational characteristic comprises at least one of setting or modifying a watering schedule of the sprinkler controller.

7. A method for enabling temporary control of a home network connected device comprising:
   receiving a remote access request from an owner device, the remote access request comprising identification information corresponding to a user device and limit information on control of the home network connected device to be granted;
   generating a remote access authorization including information corresponding to the user device and the limit information;
   transmitting the remote access authorization to the user device;
   receiving a control request from the first user device, the control request including the remote access authorization and a modification of an operating parameter of the home network connected device; and
   based on verification of the remote access authorization, updating the home network connected device based on the modification of the operating parameter.

8. The method of claim 7, wherein the remote access authorization comprises a digital security token.

9. The method of claim 7, wherein the remote access authorization is a uniform resource link.

10. The method of claim 7, wherein the home network connected device is a sprinkler controller and the operating parameter is a watering schedule for activation of sprinkler valves coupled to the sprinkler controller.

11. The method of claim 7, wherein the limit information comprises at least one of a time limit for allowing control of the home network connected device by the user device.

12. The method of claim 7, wherein the remote access request is transmitted from an application running on the owner device.

13. The method of claim 7, wherein the user device is not directly connected to the home network connected device.

14. A home network connected system comprising:
   a home network connected device; and
   a server in communication with the home network connected device, wherein the server is configured to:
      receive a shared access request for access to the home network connected device from a first user device associated with a first user, the shared access request comprising identifying information related to a second user device unable to control the home network connected device;
      generate a user account for a second user associated with the second user device using the identifying information;
      transmit shared access information corresponding to the home network connected device to the second user device,
      receive a request to modify an operational characteristic of the home network connected device from the second user device; and
      transmit operational instructions to the home network connected device based on the modified operational characteristic.

15. The home network connected system of claim 14, wherein the home network connected device is a sprinkler controller.

16. The home network connected system of claim 15, wherein the shared access information comprises control information for a level of control granted for the home network connected device.

17. The home network connected system of claim 16, wherein the level of control granted is less than an owner level of control corresponding to the first user.

\* \* \* \* \*